(12) United States Patent
Yoshida et al.

(10) Patent No.: US 7,003,302 B2
(45) Date of Patent: Feb. 21, 2006

(54) WIRELESS BASE STATION AND PACKET TRANSFER APPARATUS FOR DYNAMICALLY CONTROLLING DATA TRANSMISSION RATE

(75) Inventors: Kiyohiko Yoshida, Yokohama (JP); Hideo Aoe, Yokohama (JP); Shuichi Miyazaki, Yokohama (JP); Shuuichi Kozawa, Yokohama (JP); Koji Hirayama, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 479 days.

(21) Appl. No.: 09/929,040

(22) Filed: Aug. 15, 2001

(65) Prior Publication Data
US 2002/0068588 A1  Jun. 6, 2002

(30) Foreign Application Priority Data
Dec. 1, 2000  (JP) ............................. 2000-371494

(51) Int. Cl.
*H04Q 7/20* (2006.01)
(52) U.S. Cl. .................... 455/450; 455/451; 455/452.1; 455/452.2; 455/466; 455/561; 370/229; 370/231; 370/322; 370/329

(58) Field of Classification Search ................ 455/450, 455/451, 452.1, 452.2, 453, 461, 561, 562.1, 455/466; 370/229–238, 310.2–350, 395.4, 370/395.41, 395.42, 395.43
See application file for complete search history.

(56) References Cited

U.S. PATENT DOCUMENTS

| | | | | |
|---|---|---|---|---|
| 5,229,996 A | * | 7/1993 | Backstrom et al. | 370/507 |
| 5,857,147 A | * | 1/1999 | Gardner et al. | 455/67.11 |
| 6,253,063 B1 | * | 6/2001 | Cudak et al. | 455/63.1 |
| 6,324,172 B1 | * | 11/2001 | Pankaj | 370/342 |
| 6,411,810 B1 | * | 6/2002 | Maxemchuk | 455/453 |
| 6,463,044 B1 | * | 10/2002 | Seo | 370/329 |
| 6,510,145 B1 | * | 1/2003 | Kim et al. | 370/329 |
| 6,587,457 B1 | * | 7/2003 | Mikkonen | 370/356 |
| 6,647,262 B1 | * | 11/2003 | Demetrescu et al. | 455/436 |
| 6,714,794 B1 | * | 3/2004 | O'Carroll | 455/466 |

* cited by examiner

Primary Examiner—William Trost
Assistant Examiner—Stephen M. D'Agosta
(74) Attorney, Agent, or Firm—Mattingly, Stanger, Malur & Brundidge, P.C.

(57) ABSTRACT

In a mobile communication system in which a plurality of base stations are connected to a communication network via a packet transfer node and a transmission rate of a forward link radio channel between a base station and a mobile station dynamically changes, each of the base stations designates a packet transmission rate in accordance with the status of a radio channel of each of mobile stations under control for the packet transmission node, and the packet control node transfers packets destined for each of mobile stations to the base station at the designated transfer rate.

5 Claims, 28 Drawing Sheets

GRE ENCAPUSULATED PACKET

FIG. 7

SESSION MANAGEMENT TABLE 506

| 701 | 702 | 703 | 704 | 705 | 706 | 707 |
|---|---|---|---|---|---|---|
| BS-PCF SESSION ID (KEY OF GRE) | MOBILE STATION ID (IMSI) | RADIO CHANNEL ID | AVERAGE OF RADIO CHANNEL TRANSMISSION RATE | USED BUFFER AREA | NEXT SEQUENCE NO. | CURRENT PRIORITY |
| ˋ ˋ | ˋ ˋ | ˋ ˋ | ˋ ˋ | ˋ ˋ | | |
| ˋ ˋ | ˋ ˋ | ˋ ˋ | ˋ ˋ | ˋ ˋ | | |
| ˋ ˋ | ˋ ˋ | ˋ ˋ | ˋ ˋ | ˋ ˋ | | |
| . | . | . | . | . | | |
| . | . | . | . | . | | |
| . | . | . | . | . | | |

FIG. 8

FLOW CONTROL MESSAGE

| BYTE 0 | 1 | 2 | 3 | |
|---|---|---|---|---|
| TCP/IP HEADER | | | | |
| BASE STATION ADDRESS | | | | 801 |
| NUMBER OF SESSIONS (n) | | | | 802 |
| SESSION ID (KEY OF GRE) | | | | 803 ⎫ |
| PRIORITY (TRANSFER RATE) | | | | 804 ⎬ SESSION INFORMATION 1 |
| NEXT SEQUENCE NO. | | | | 805 ⎭ |
| SESSION ID (KEY OF GRE) | | | | ⎫ |
| PRIORITY (TRANSFER RATE) | | | | ⎬ SESSION INFORMATION 2 |
| NEXT SEQUENCE NO. | | | | ⎭ |
| . . . | | | | |
| SESSION ID (KEY OF GRE) | | | | ⎫ |
| PRIORITY (TRANSFER RATE) | | | | ⎬ SESSION INFORMATION n |
| NEXT SEQUENCE NO. | | | | ⎭ |

FIG. 9

| AVERAGE OF RADIO CHANNEL TRANSMISSION RATE: n(kbps) | VALUE OF PRIORITY | PACKET TRANSFER PRIORITY (RATE) BETWEEN PCF AND BS |
|---|---|---|
| 2450 < n ≤ 2457.6 | 246 | HIGH |
| 2440 < n ≤ 2450 | 245 | ↑ |
| . . . | . . . | |
| | | ↓ |
| 40 < n ≤ 50 | 5 | |
| 38.4 ≤ n ≤ 40 | 4 | LOW |

901 902 903

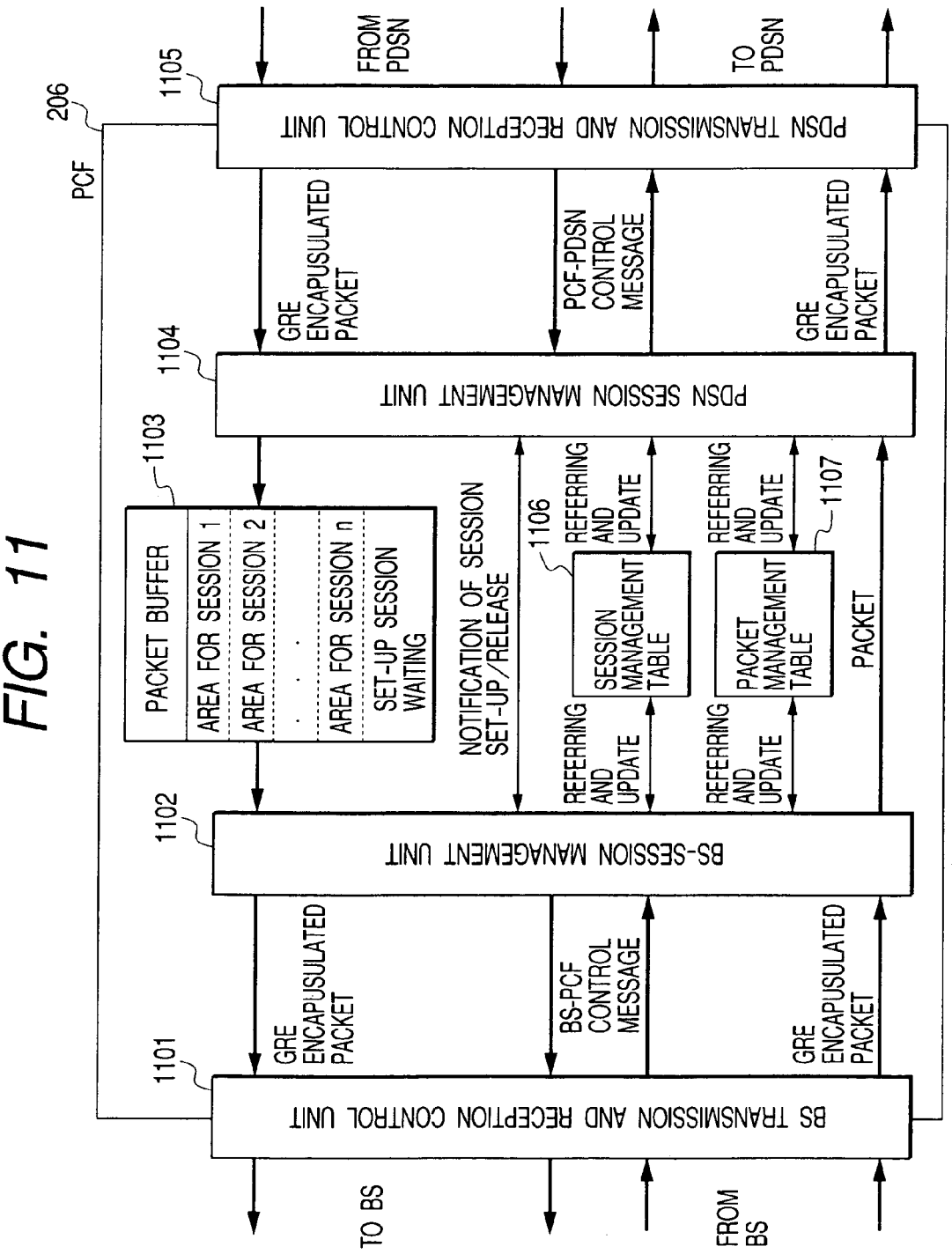

FIG. 12A

SESSION MANAGEMENT TABLE 1106

| SOURCE PDSN ADDRESS (1201) | PCF-PDSN SESSION ID (KEY OF GRE) (1202) | DESTINATION BS ADDRESS (1203) | BS-PCF SESSION ID (KEY OF GRE) (1204) | DESTINATION MS ID (IMSI) (1205) | PRIORITY OF DESTINATION MS (1206) | AMOUNT OF FUFFERING PACKETS (1207) | NEXT SEQUENCE NO. (1208) |
|---|---|---|---|---|---|---|---|
| ~~ | ~~ | ~~ | ~~ | ~~ | ~~ | ~~ | ~~ |
| ~~ | ~~ | ~~ | ~~ | ~~ | ~~ | ~~ | ~~ |
| . . . | . . . | . . . | . . . | . . . | . . . | . . . | . . . |

FIG. 12B

PACKET MANAGEMENT TABLE 1107

| DESTINATION MS ID (IMSI) (1209) | SEQUENCE NO. (1210) | PACKET LENGTH (1211) | BUFFER MEMORY ADDRESS (1212) |
|---|---|---|---|
| ~~ | ~~ | ~~ | ~~ |
| ~~ | ~~ | ~~ | ~~ |
| . . . | . . . | . . . | . . . |

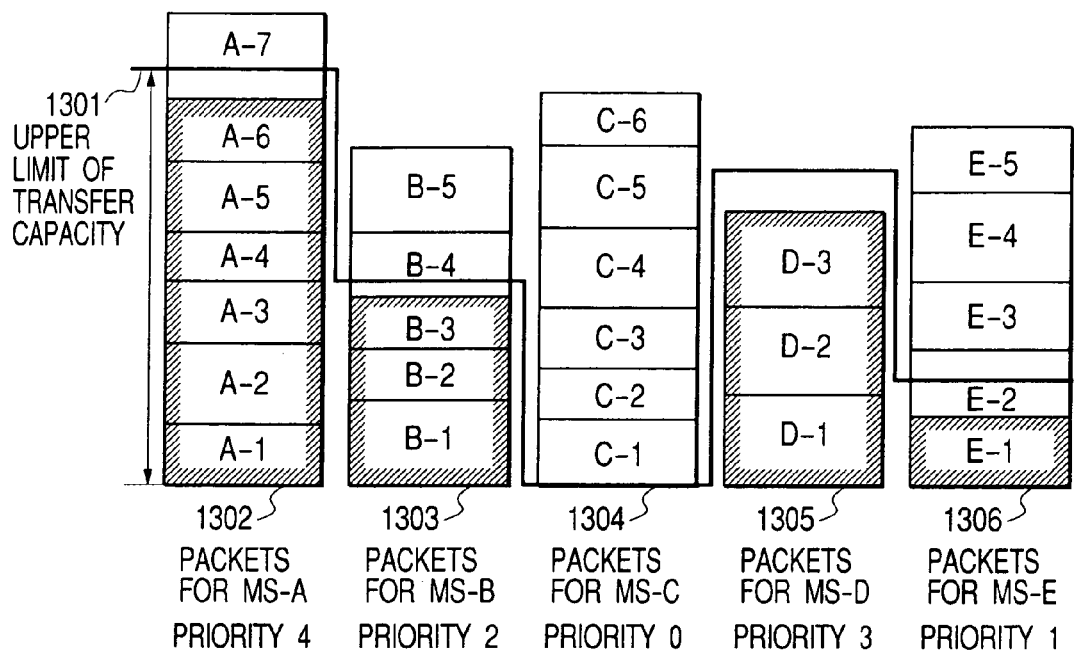
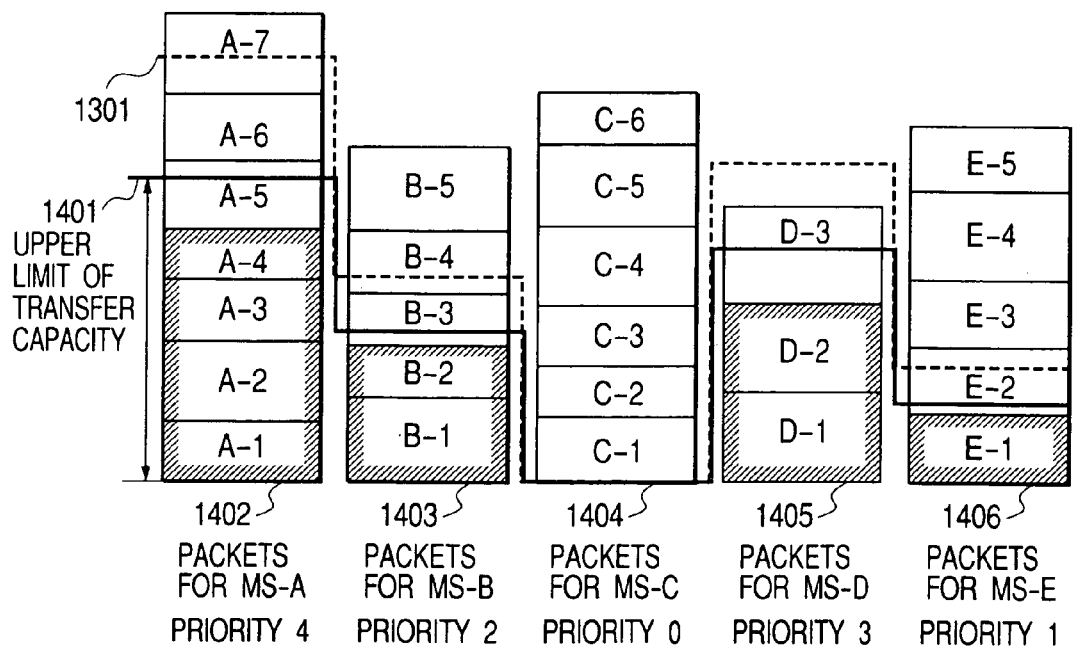

FIG. 22

RATE CLASS DIVISION TABLE
220

| AVERAGE VALUE n(kbps) OF RADIO CHANNEL TRANSMISSION RATE | LEVEL OF RATE CLASS |
|---|---|
| $1843.2 < n \leq 2457.6$ | 9 |
| $1228.8 < n \leq 1843.2$ | 8 |
| $921.6 < n \leq 1228.8$ | 7 |
| $614.4 < n \leq 921.6$ | 6 |
| $307.2 < n \leq 614.4$ | 5 |
| $153.6 < n \leq 307.2$ | 4 |
| $76.8 < n \leq 153.6$ | 3 |
| $38.4 < n \leq 76.8$ | 2 |
| $0 \leq n \leq 38.4$ | 1 |

FIG. 23A

SESSION MANAGEMENT TABLE 516

| BS-PCF SESSION ID (KEY OF GRE) 2301 | MOBILE STATION ID (IMSI) 2302 | TRAFFIC CHANNEL ID 2303 | AVERAGE TRANSMISSION RATE 2304 | RATE CLASS 2305 |
|---|---|---|---|---|
| ~~ | ~~ | ~~ | ~~ | ~~ |
| ~~ | ~~ | ~~ | ~~ | ~~ |
| ⋮ | ⋮ | ⋮ | ⋮ | ⋮ |

FIG. 23B

WINDOW MANAGEMENT TABLE 517

| DESTINATION BS ADDRESS 2306 | RATE CLASS 2307 | WINDOW SIZE 2308 | NEXT SEQUENCE NO. 2309 |
|---|---|---|---|
| ~~ | ~~ | ~~ | ~~ |
| ~~ | ~~ | ~~ | ~~ |
| ⋮ | ⋮ | ⋮ | ⋮ |

FIG. 27A

SESSION MANAGEMENT TABLE 2609

| SOURCE PDSN ADDRESS (2701) | PCF-PDSN SESSION ID (GRE KEY) (2702) | DESTINATION BS ADDRESS (2703) | BS-PCF SESSION ID (GRE KEY) (2704) | RATE CLASS (2705) |
|---|---|---|---|---|
| ~~ | ~~ | ~~ | ~~ | ~~ |
| ~~ | ~~ | ~~ | ~~ | ~~ |
| ... | ... | ... | ... | ... |

FIG. 27B

WINDOW MANAGEMENT TABLE 2605

| DESTINATION BS ADDRESS (2706) | RATE CLASS (2707) | WINDOW SIZE (2708) | NEXT SEQUENCE NO. (2709) | AMOUNT OF BUFFERING PACKETS (2710) |
|---|---|---|---|---|
| ~~ | ~~ | ~~ | ~~ | ~~ |
| ~~ | ~~ | ~~ | ~~ | ~~ |
| ... | ... | ... | ... | ... |

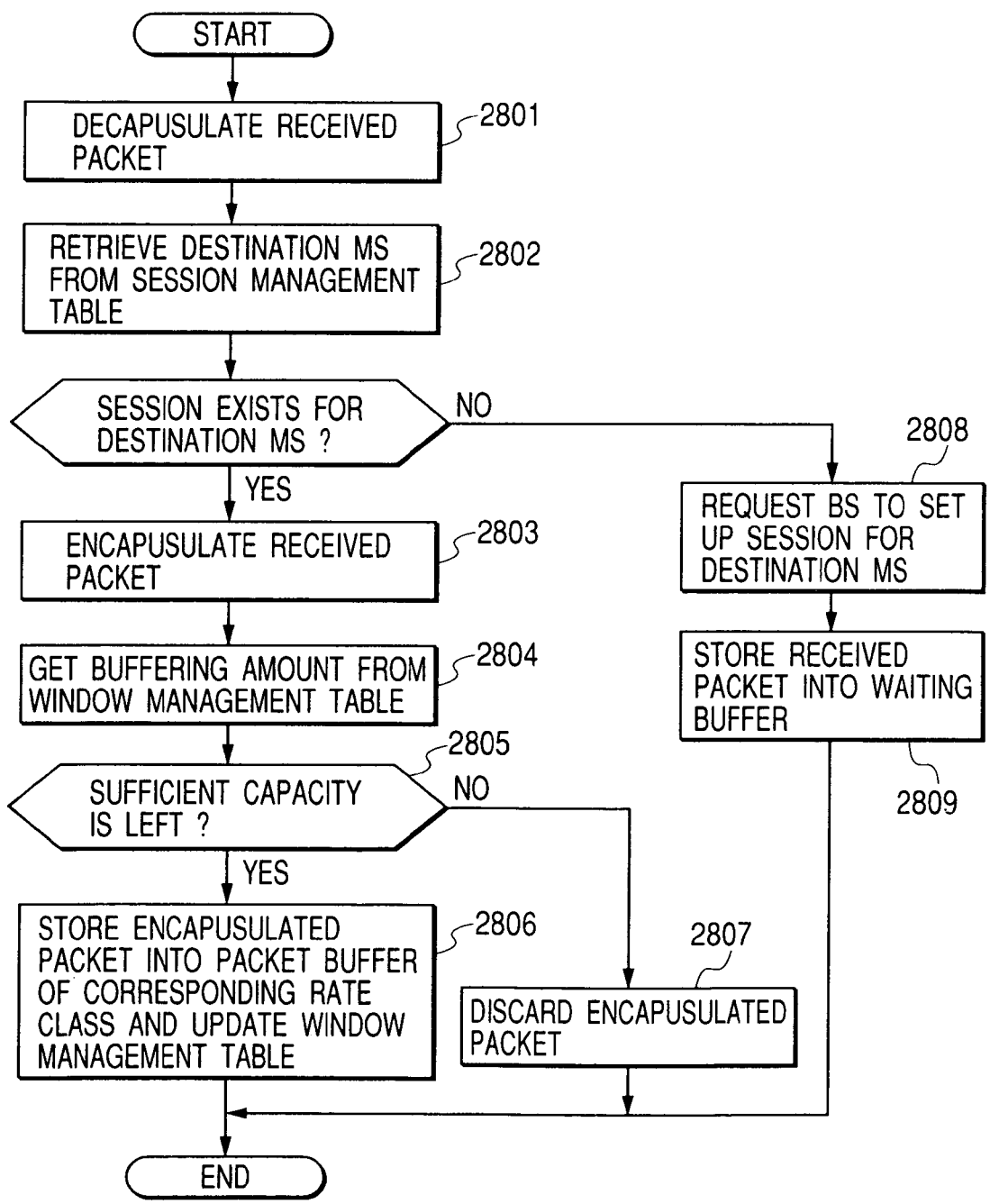

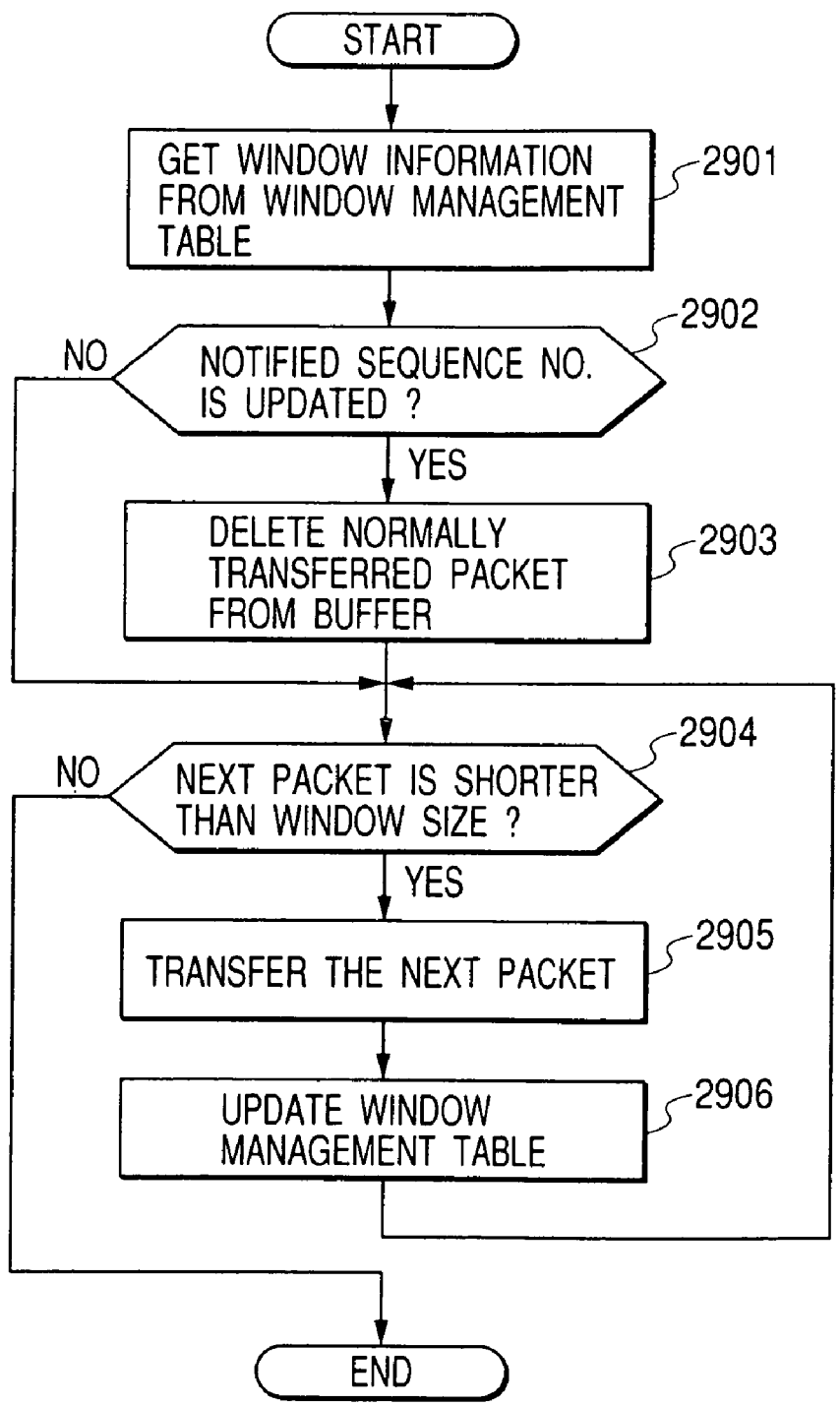

WIRELESS BASE STATION AND PACKET TRANSFER APPARATUS FOR DYNAMICALLY CONTROLLING DATA TRANSMISSION RATE

BACKGROUND OF THE INVENTION (1) Field of the Invention

The present invention relates to a mobile wireless packet data communication technique and, more particularly, to a wireless base station, a packet transfer apparatus, and a wireless communication system adapted to a packet data wireless communication system in which a data transmission rate dynamically changes in a radio channel.

(2) Description of the Related Art

In recent years, rapid growth of the Internet creates new needs for the high-speed wireless transmission technique. A wireless portable terminal performs not only speech communications but also, for example, communications of electronic mails, accesses to the Web, and increasingly uses an application via an IP network accompanying data transfer of a large amount such as distribution of music data and image data.

In the wireless data communications, when the status of a radio path deteriorates and a noise level becomes higher than a reception signal level, a burst bit error often occurs. When the status of the radio path is good and the reception signal level is relatively high, an error free state is achieved and no error occurs. Consequently, as one of means for realizing high-speed radio transmission, a method of performing a best-effort type communication by controlling parameters of modulation and an encoding system to optimum values while considering the degree of interference noise in a radio path has been proposed, for example, a method (hereinbelow, called a "1×EV method") described by Paul Bender, Peter Black, Matthew Grob, Roberto Padovani, Nagabhushana Sindhushayana, and Andrew Viterbi, QUALCOMM, Incorporated "CDMA/HDR: A Bandwidth-Efficient High-Speed Wireless Data Service for Nomadic Users", IEEE Communications Magazine, Vol. 38, pp. 70–77, July, 2000.

Connection on a radio path is, however, generally unstable as compared with connection on a wired IP network, and its transmission rate is generally low. Japanese Unexamined Patent Application No. 10-174185 describes that a wireless base station is provided with a buffer to absorb a difference in transmission rates in an interwork between an IP network and a radio network, and packet data to be transmitted to a mobile station is temporarily stored in the buffer.

SUMMARY OF THE INVENTION

When the speed difference in the interwork between the IP network and the radio network is large, there is a situation such that a base station cannot transmit packets transferred from the IP network side to a mobile station, an overflow of the buffer occurs in the base station, and packets have to be discarded. When a buffer of a large capacity is provided in the base station, such a situation can be avoided. However, since the size of the buffer required by each base station changes with time, it is difficult to determine a proper buffer size. When the buffer of a large capacity for avoiding the buffer overflow is provided in each of a number of base stations, the costs increase, and it becomes unrealistic. Further, when a mobile station moves from one radio sector to another radio sector, packet transfer has to be carried out between the base stations for managing the radio sectors, and a large delay or packet dropout may occur.

On the other hand, by providing a buffer at a node seperate from the base stations, the packet dropout can be prevented. In this case, since the node cannot grasp the status of a radio channel such as the difference in the transmission rates of the radio channels of respective users, the node has to transfer packets at the same rate to a plurality of base stations connected to the node. In order to avoid the buffer overflow in the base station, the node has to transfer packets to each of base stations at a low speed. As a result, packets are supplied only at a low speed even to a high-speed radio channel, so that radio resources are wasted.

At present, The 1×EV (1×Evolution) system of a high data rate (HDR) which is being standardized by Third Generation Partnership Project Two (3GPP2) is specialized in increasing a forward link data transmission rate from a base station to a mobile station largely fluctuates from 38.4 to 2457.6 kbps during communication depending on the status of a radio channel of each mobile station, this problem is conspicuous.

It is an object of the invention to provide a wireless base station and a packet transfer apparatus suitable for a radio data communication system in which the transmission rate in a radio channel dynamically changes.

It is another object of the invention to provide a wireless base station, a packet transfer apparatus, and a wireless communication system capable of avoiding packets from being discarded due to buffer overflow in a wireless base station when a radio transmission rate decreases, and maximally utilizing the radio transmission rate when the transmission rate increases.

In order to achieve the objects, according to the invention, in a CDMA mobile communication system including a packet transfer apparatus for temporarily storing packets destined for a mobile station, in accordance with a dynamic change in a transmission rate of a radio channel for transmitting data to a mobile station, a base station dynamically determines a transmission rate of packets or a transferable amount of data destined for the mobile station from the packet transfer apparatus to the base station, and notifies the packet transfer apparatus of the determined transmission rate or transferable data amount. The packet transfer apparatus transfers the packet destined for the mobile station to the base station at a proper transmission rate or within the transferable data amount according tot he notification.

According to the invention, a packet transfer apparatus connected between a plurality of base stations for conducting communication with a plurality of mobile stations via radio channels and a communication network, for transferring packets received from the communication network to a base station accommodating a destination mobile station of the received packets comprises: storing means for storing packets received from the communication network correlating the packets with the destination mobile station; receiving means for receiving a control message from a base station, the message indicative of a rate of transmission between a specific mobile station and the base station; and control means for reading out packets destined for the specific mobile station from the storing means in accordance with the contents of the control message received by the receiving means and transmitting the packet to the base station to which the specific mobile station is connected.

According to the invention, a base station for conducting communication with a plurality of mobile stations via radio channels, the base station constructing a wireless communication system together with a packet transfer apparatus connected to a communication network, comprises: a receiving unit for receiving information which designates a forward line transmission rate from each of the mobile stations; a controller for transmitting a flow control message for designating a rate of packet transfer from the packet transfer apparatus to the base station in accordance with the forward link transmission rate designated by each of the mobile stations, to the packet transmission apparatus; a buffer for temporarily storing packets received from the packet transfer apparatus and a transmitter for transmitting the packets stored in the buffer to a radio channel in accordance with the forward link transmission rate designated by the destination mobile station.

A wireless communication system according to the invention has: a plurality of base stations for performing communication with a plurality of mobile stations in their control areas via radio channels, and a packet transfer apparatus connected between the base stations and a communication network. Each of the base stations has means for receiving a notification of a transmission rate, which is calculated on the basis of a signal received from the base station, from each of the mobile stations in the control areas, and means for generating a control message for designating a packet transfer rate for each mobile station, and transmitting the control message to the packet transfer apparatus. The packet transfer apparatus has means for buffering packets received from the communication network and selectively transferring the packets to each of the base stations at a packet transfer rate peculiar to the destination mobile station designated by the control message.

BRIEF DESCRIPTION OF THE DRAWINGS

FIG. 7 is a diagram showing a control table of the base station.

FIG. 8 is a diagram showing the format of a flow control message generated by the base station.

FIG. 9 is a diagram for explaining the corresponding relation between a transmission rate in a radio channel and packet transfer priority.

FIG. 11 is a functional block diagram showing a first embodiment of a PCF node.

FIG. 12A is a diagram showing the configuration of a session management table of the PCF node.

FIG. 12B is a diagram showing the configuration of a packet management table of the PCF node.

FIG. 13 is a diagram for explaining a packet transfer scheduling method at the PCF node.

FIG. 14 is a diagram for explaining a method of changing the packet transfer scheduling in the event of congestion.

FIG. 22 is a diagram showing a corresponding relation between a radio channel transmission rate and a transfer rate class in the second embodiment.

FIG. 23A is a diagram showing the configuration of a session management table of the radio station of the second embodiment.

FIG. 23B is a diagram showing the configuration of a window management table of the radio station of the second embodiment.

FIG. 27A is a diagram showing the configuration of a session management table of the PCF node of the second embodiment.

FIG. 27B is a diagram showing the configuration of a window management table of the PCF node of the second embodiment.

FIG. 28 is a flowchart showing a packet tunnel transferring operation executed by the PCF node of the second embodiment.

FIG. 29 is a flowchart showing a packet transfer control executed by the PCF node of the second embodiment.

DESCRIPTION OF THE PREFERRED EMBODIMENTS

Embodiments of the invention will be described in detail hereinbelow with reference to the drawings.

Figure 2:
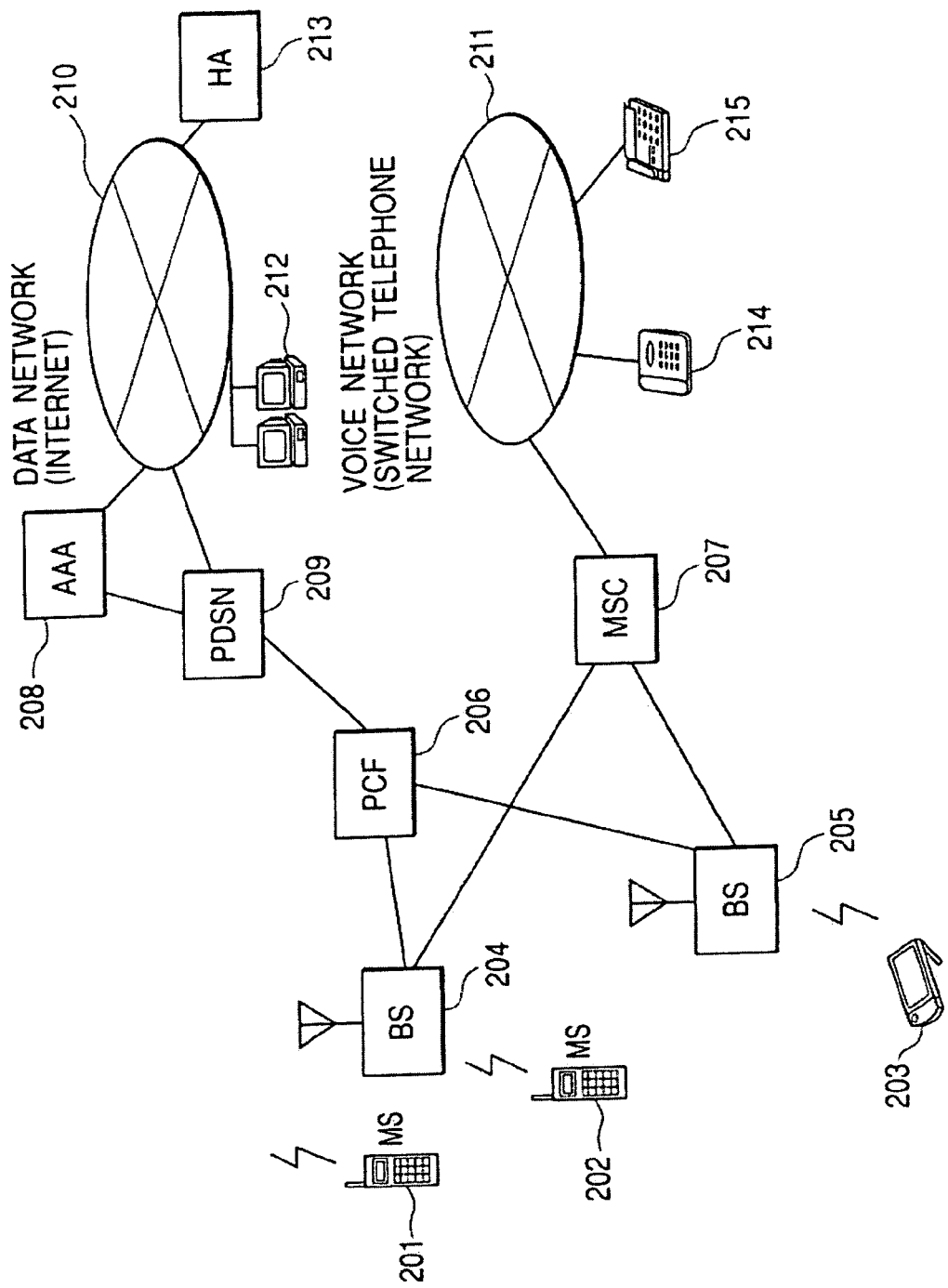
FIG. 2 is a diagram for explaining a general configuration of a network system to which the invention is applied.

FIG. 2 schematically shows a "cdma200" wireless communication network architecture which is being standardized at present by the 3GPP2 (3rd Generation Partnership Project 2) to realize a 3rd generation CDMA radio communication network.

Traffic channels for radio communication are assigned to mobile stations (MS) 201 to 203 such as portable telephones from base stations (BS) 204 and 205. The mobile stations 201 to 203 perform communications with the base stations through the traffic channels. In the case of speech communication, each mobile station is connected to a voice network (switched telephone network) 211 via an MSC (Mobile Switching Center) 207 as a relay node. In the case of data communication, the mobile stations are connected to a data network (Internet) 210 via a PCF (Packet Control Function) node 207 as a packet transfer apparatus. To the data network, a PDSN (Packet Data Serving Node) 209 having an agent function of transferring IP packets destined to the mobile stations in accordance with a mobile IP protocol, a home agent node 213, and an AAA (Authentication, Authorization, and Accounting) server 208 for authenticating a data service user and collecting accounting information are connected.

In accordance with the mobile IP protocol, a packet destined for a mobile station transmitted from a host 212 connected to the data network 210 is transferred via the PDSN 209 to the PCF node 206, transferred from the PCF node 206 to the base station 204 or 205, and transmitted from the base station 204 or 205 to the destined mobile station via the radio channel.

Between the PDSN 209 and the PCF node 206 as well as between the PCF node 206 and each of the base stations 204 and 205, packets destined to mobile stations are transferred by tunneling in a form of encapsulated with a GRE header in conformity with the GRE (Generic Routing Encapsulation) protocol specified in Internet standard RFC1701 by IETF (Internet Engineering Task Force).

Figure 3:
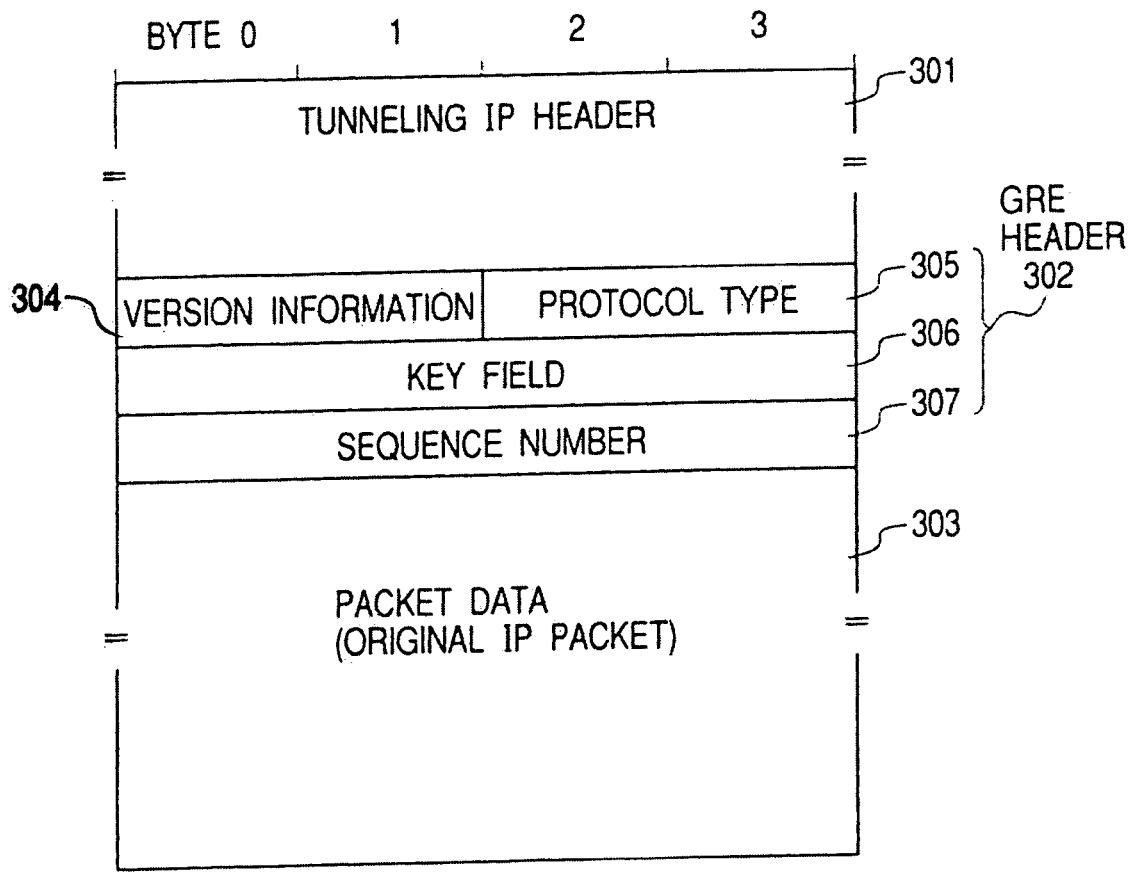
FIG. 3 is a diagram showing the format of a GRE encapsulated packet.

FIG. 3 shows the format of a GRE encapsulated packet. The GRE encapsulated packet is constructed by a tunneling IP header 301, a GRE header 302, and packet data (original IP packet) 303. In a key field 306 of the GRE header 302, a session ID corresponding to a destination mobile station of the packet is set. A sequence number 307 is updated every packet transmission. Although the sequence number may be incremented by one every packet transmission, in the embodiment, a method of adding the size of a packet to the sequence number 307 every packet transmission is employed.

Figure 4:
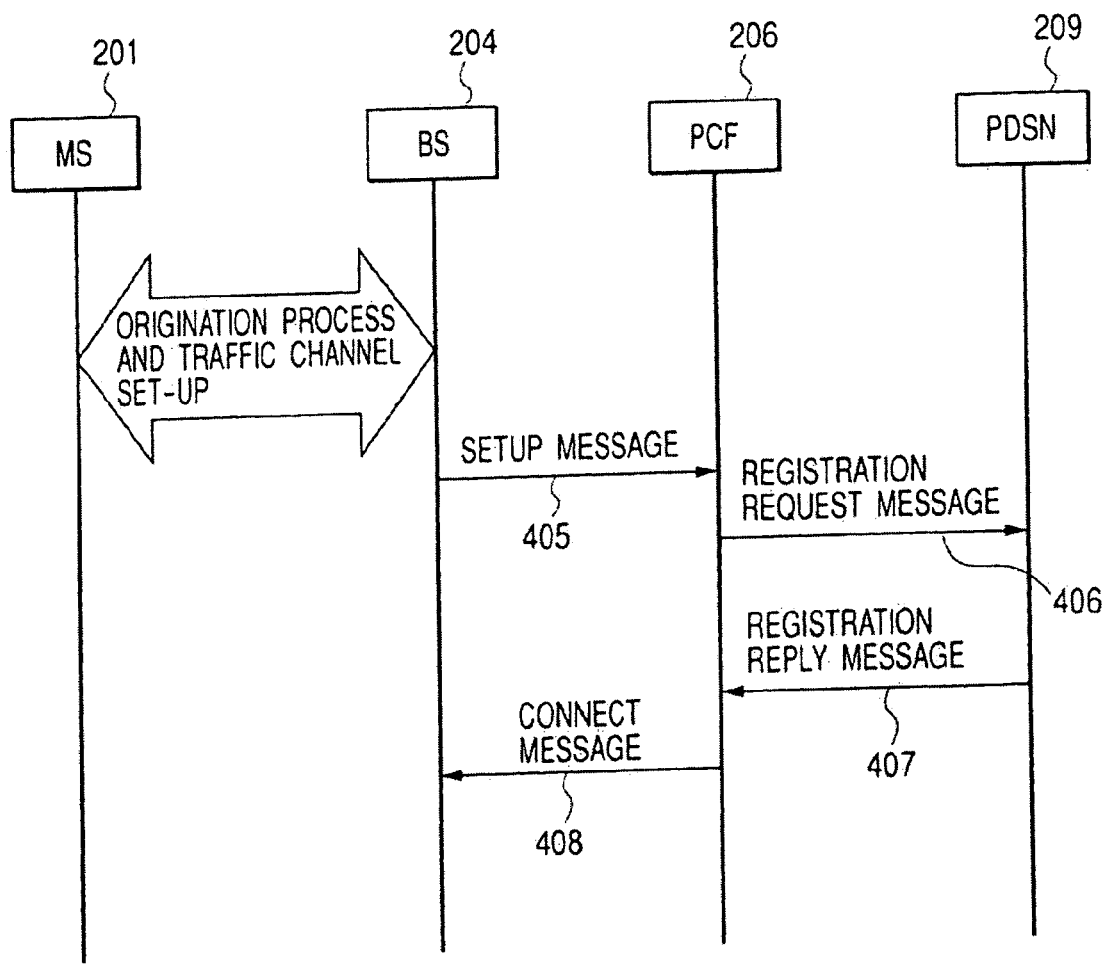
FIG. 4 is a diagram for explaining a session set-up sequence at the time of starting data communication service.

FIG. 4 shows a sequence of starting data communication service specified by 3GPP2 standard A.S0001.

By a setup message 405, a session ID between the base station 204 and the PCF node 206 is notified from the base station 204 to the PCF node 206. By a registration request message 406, a session ID between the PCF node 206 and the PDSN 209 is notified from the PCF node 206 to the PDSN 209. Between the base station 204 and the PCF node 206, and between the PCF node 206 and the PDSN 209, the session ID unconditionally corresponds to the mobile station 201 at the destination. The destination mobile station of each packet is specified by the session ID set in the key field 306 in the GRE header 302.

The above is the outline of the packet data communication in the "cdma 200" wireless network architecture. At present, as a system specialized in data communication on the architecture, the above-described HDR (1×EV) system is being standardized by 3GPP2.

A radio terminal in the HDR (1×EV) system monitors a pilot signal from a base station during data communication and predicts the best radio sector for receiving forward link data and the transmission rate of the radio sector on the basis of a C/I (Carrier-to-Interference) radio of the pilot signal. The predicted radio sector and transmission rate are notified to the base station via a DRC (Data Rate Control) channel in cycles of 1.67 ms to 13.33 mm. The predicted radio sector and transmission rate can be notified as appropriate by a fixed mode request as one of control messages.

The base station dynamically switches a sector and transmission rate for transmitting forward link data to the radio terminal on the basis of the notifications. The embodiment of the invention will be described hereinbelow on the precondition that the data communication architecture is used. The PCF node 206 can be called a packet transfer apparatus from its functions.

Figure 1:
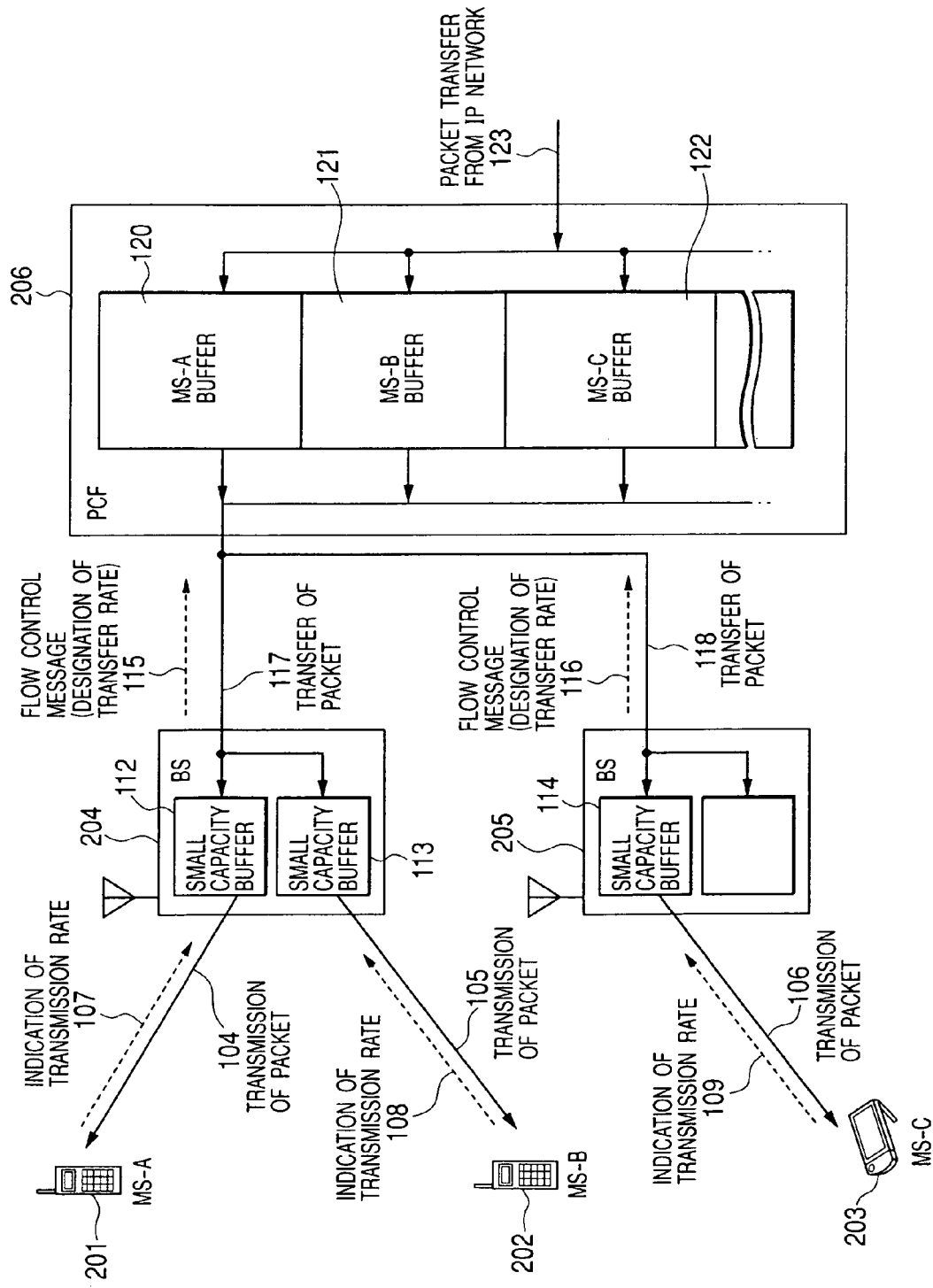
FIG. 1 is a diagram for schematically explaining a first embodiment of a packet transfer control according tot he invention.

FIG. 1 shows an outline of a first embodiment of the packet transfer control according to the invention.

A group of packet 123 sent from an IP network to a mobile station are once buffered by the PCF node 206, transferred to the base station 204 or 205 accommodating destination mobile stations, and transferred from the base station 204 to the mobile station 201 or 202 or from the base station 205 to the mobile station 203. As shown in the diagram, the base stations 204 and 205 have buffers 112 to 114 for temporarily storing received packets. Each of the buffers is of a very small capacity which is the minimum required for scheduling transmission on a radio channel or re-transmitting packets in the event that a transfer error occurs in the radio channel. The speed difference between the radio channel and the IP network is absorbed by using buffers 120 to 122 provided for the PCF node 206. By absorbing the speed difference at the PCF node, it becomes unnecessary to calculate the proper buffer size for absorbing the speed difference with respect to a number of base stations constructing the ratio communication system and to install a buffer of a large capacity for each base station. Thus, the cost of the whole communication system can be reduced.

As described hereinbefore, in the HDR (1×EV) system, the transmission rate of the forward link radio channel for transmitting packets from a base station to each mobile station is determined by the mobile stations 201 to 203 in accordance with the radio state detected by the mobile stations, and the determined transmission rate is notified to the base stations 204 and 205 as shown by 107 to 109 in FIG. 1 via the foregoing DRC channel or the like. The base stations 204 and 205 transmit data in the buffers 112 to 114 to mobile stations at the transmission rates instructed by the mobile station.

Since the transmission rates of the mobile stations are different from each other, the rate of transmitting packets from the buffers also varies according to mobile stations and dynamically changes. Consequently, when the base station receives the packets from the PCF node 206, the base station determines the transmission rate, that is, priority, in the radio channel for each mobile station, and notifies it to the PCF node 206 by flow control messages 115 and 116. When the used area of any of the buffers 112 to 114 exceeds a predetermined upper limit threshold, the base stations 204 and 205 give an instruction to the PCF node 206 by the flow control messages 115 and 116, so that the transfer of packets for the mobile station corresponding to the buffer is temporarily stopped. The PCF node 206 transfers packets destined for the mobile stations 201 to 203 to the base stations 204 and 205 at the transfer rate instructed by the flow control messages 115 and 116.

As described above, the packets for the mobile stations are temporarily stored in the PCF node and the transfer rate to the base station accommodating the mobile stations is determined in consideration of the transfer rate in the radio channel of each mobile station. Consequently, even when the mobile stations 201 to 203 move to a radio sector managed by another base station, the buffers 120 to 122 in the PCF node 206 can be continuously used. For example, in FIG. 1, when the mobile station 202 in the radio sector of the base station 204 moves (hands off) to the radio sector of the base station 205, the PCF node 206 transfers the packets destined for the mobile station 202 to the base station 205 at a rate according to the priority indicated by the flow control message 116 from the base station 205.

Figure 5:
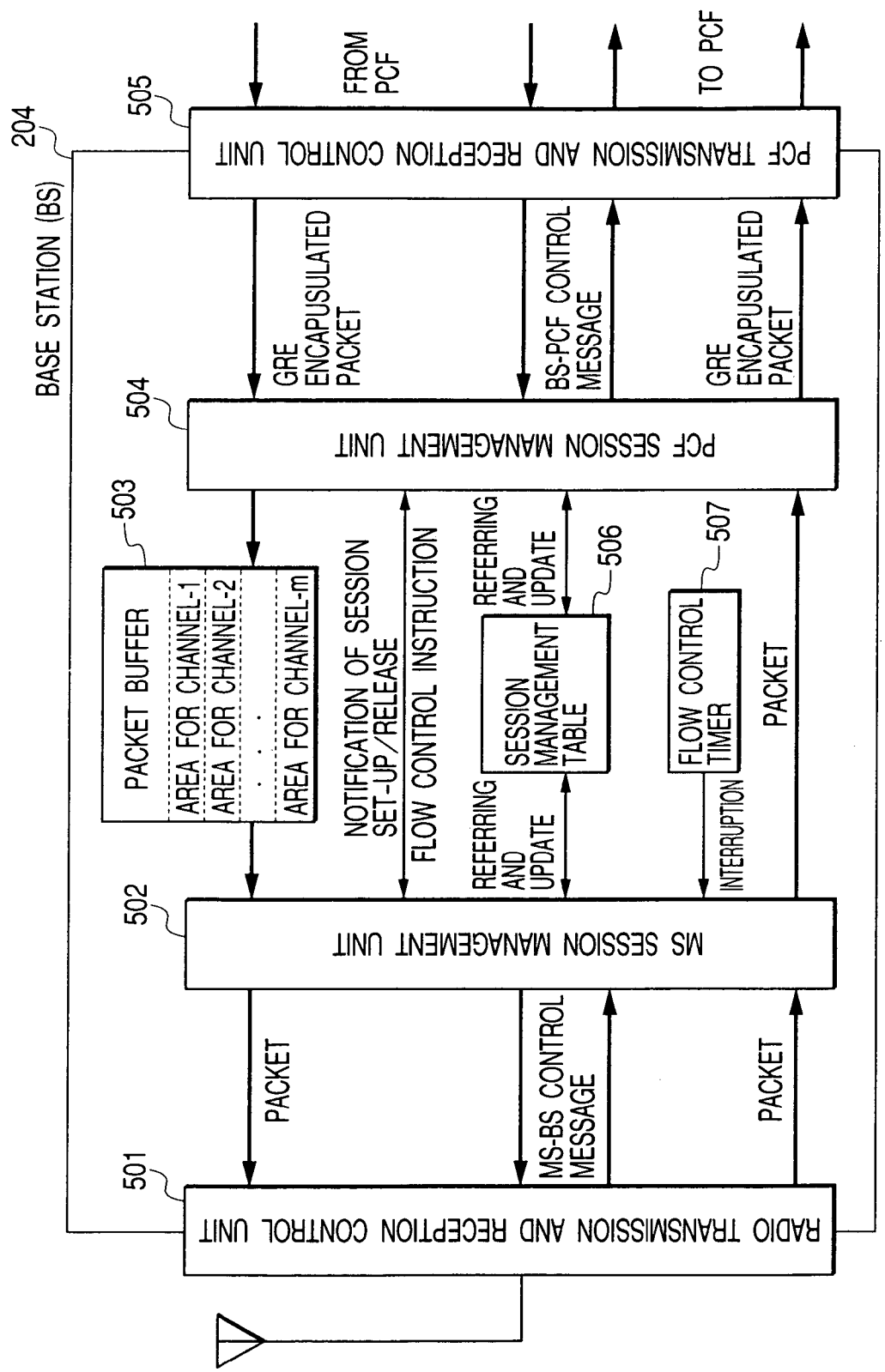
FIG. 5 is a functional block diagram showing a first embodiment of a base station.

A concrete system configuration of the first embodiment of the invention will be described in detail hereinbelow. The base station 204 in the first embodiment comprises of functional blocks as shown in FIG. 5. The other base station 205 has a configuration similar to that of the base station 204.

An MS session management unit 502 manages a session with a mobile station, that is, assignment, release, and the like of a radio channel. A radio transmission and reception control unit 501 controls a pilot channel and a traffic channel assigned to a mobile station. A PCF session management unit 504 exchanges control messages as shown in FIG. 4 with the PCF node and manages set-up, release, and the like of a session between the base station 204 and the PCF node 206. A PCF transmission and reception control unit 505 controls a transmission path for communication with the PCF node 206. A flow control timer 507 is a timer for controlling a transfer amount of packets between the PCF node 206 and the base station 204 every predetermined cycle. A session management table 506 correlates a session between the mobile station and the base station and a session between the base station and the PCF node. As a packet buffer 503 used for forward link packet transmission scheduling, a data re-transmission control on an octet unit basis in the case where an error occurs in a radio channel, and the like, a buffer of the minimum capacity is assured for each radio channel.

Figure 6:
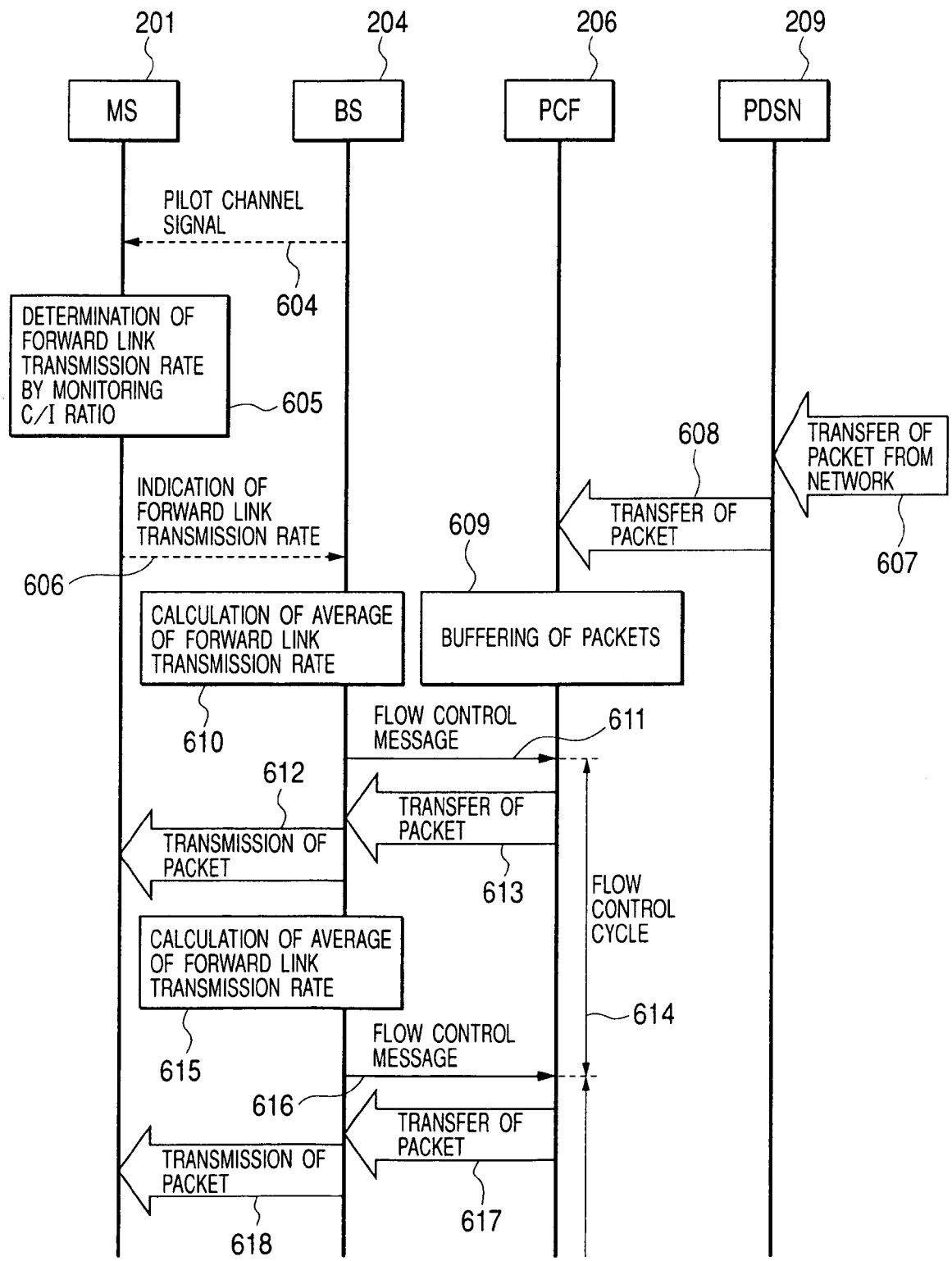
FIG. 6 is a diagram for explaining a control sequence performed among a mobile station, a base station, and a PCF node.

FIG. 6 shows a control sequence among the mobile station 201, base station 204, and PCF node 206 in the first embodiment of the invention.

As shown in FIG. 6, the base station 204 always transmits a pilot channel signal 604 toward mobile stations in the radio sector of itself. Each mobile station receives the pilot channel signal, measures the C/I (Carrier-to-Interference) ratio, determines a forward link transmission rate according to the C/I ratio (step 605), and notifies the base station of the rate (step 606). The MS session management unit 502 calculates an average of the transmission rates for each mobile station on the basis of the values of the requested transmission rates notified from the mobile stations every predetermined flow control cycle indicated by the flow control timer 507 (steps 610 and 615), and stores the calculated value in the session management table 506.

FIG. 7 shows the configuration of the session management table 506 of the base station.

An item 702 denotes an ID of a mobile station and, for example, IMSI (International Mobile Station Identifier) is used. An item 701 denotes a session ID determined between a base station and the PCF node to transmit and receive packets to and from a mobile station indicated by the mobile station ID. The session ID is notified by the setup message 405 shown in FIG. 4. The ID is set in the key field in the GRE header shown in FIG. 3 in the tunneling transfer of packets between the PCF node and the base station. An item 703 denotes a radio channel ID assigned to the mobile station and its range depends on the number of channels supported by the base station. An item 705 denotes a current used area of a buffer (503 in FIG. 5) assigned to the channel.

As shown in FIG. 3, in order to set the sequence number in the GRE header in a packet transferred from the PCF node, the sequence number of a packet to be transferred next is stored in an item 706 of the session management table. The radio transmission rate average is stored as an item 704 of the session management table and, as will be described hereinlater, current priority is set an item 707 according to the average value.

The MS session management unit 502 stores the value of the radio transmission rate average in the session management table and, after that, instructs the PCF session management unit 504 to generate the flow control message. In such a manner, by the cooperation of the MS session management unit 502, session management table 506, and PCF session management unit 504, the base station 204 generates the flow control message instructing the transmission rate of packets for the mobile stations under control, and transmits the message to the PCF node 206 (steps 611 and 617 in FIG. 6). The PCF node 206 transfers the packet destined for the mobile station received from the PDSN 209 to the base station 204 at the transmission rate designated by the flow control message (steps 613 and 617), and the base station 204 transmits the packets to the radio channel at the transmission rate designated by the destination mobile station (steps 612 and 618).

FIG. 8 shows the format of the flow control message.

The flow control message includes a plurality of session information blocks, each of which includes a session ID (item 803) of each mobile station, packet priority (item 804) at the time of transferring the packets destined for the mobile station from the PCF node to the base station, and sequence number 805 of the packet to be transferred next. The flow control message also includes the number of session information blocks (item 802) and an address (item 801) of the base station.

The priority (item 804) of each mobile station is set according to the forward link transmission rate average of each mobile station stored in the session management table 506. In other words, the high priority is set for the mobile station which has a better state of the radio channel and can receive packets at a high rate.

FIG. 9 shows an example of the corresponding relations among an average of radio channel transmission rate 901, priority 902, and priority 903 of packet transfer between the PCF node and the base station. As an exception of the priority setting method, when the used area in the buffer 503 in FIG. 5 assigned to the channel of a mobile station exceeds the predetermined upper limit threshold, for example, 80% of the assigned buffer capacity, the priority is set to 0. This means that the transmission of the packets destined for the mobile station from the PCF node 206 to the base station 204 is temporarily stopped. By setting a value other than 0 as the priority at the time point when the buffer used area drops below the predetermined lower limit threshold, for example, 60% of the assigned buffer capacity, the PCF node can re-start the transfer of packets destined for the mobile station.

Figure 10:
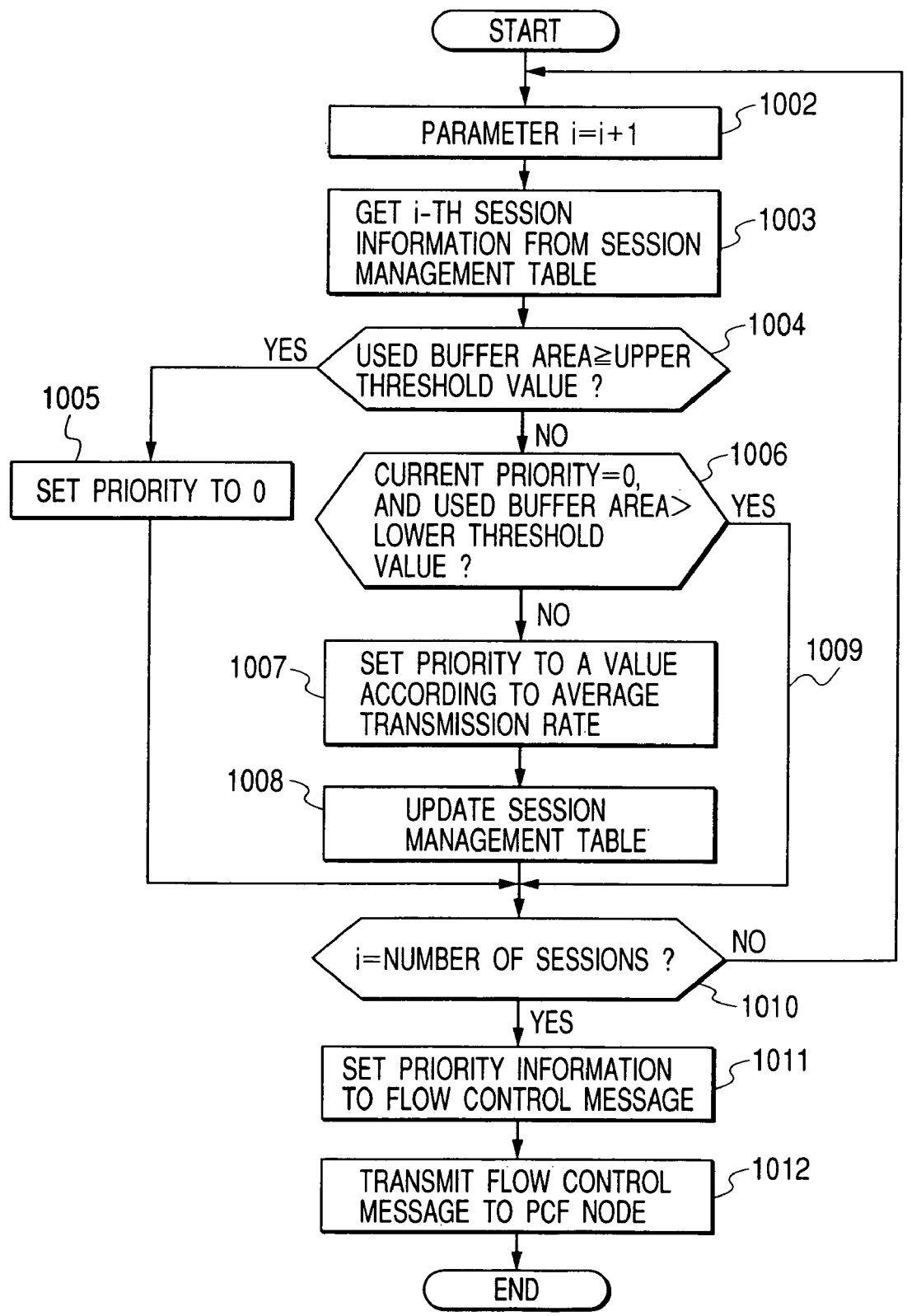
FIG. 10 is a flowchart showing a procedure of generating the flow control message in the base station.

FIG. 10 shows a procedure of generating the flow control message in the base station 204.

First, the current priority 707, a used buffer area 705, and an average transmission rate 704 are read out as session information from the session management table 506 for each mobile station as a destination of a packet (step 1003). When the used buffer area exceeds the predetermined upper limit threshold (step 1004) to interrupt the packet transfer from the PCF node 206, the priority is set to zero (step 1005). When the current priority is zero, that is, the packet transfer from the PCF node 206 is interrupted, and the used buffer area does not drop below a predetermined lower limit threshold value (step 1006), the packet transfer from the PCF node 206 cannot be re-started. Consequently, the priority maintains the zero state (step 1009). In the other cases, the value of the priority 902 shown in FIG. 9 is determined according to the average transmission rate on the radio channel (step 1007), and the value of the priority 707 in the session management table is updated (step 1008). For all the mobile stations to which channels are assigned, procedures 1002 to 1010 are repeated, and the session information is set in the flow control message (step 1011) and the flow control message is transmitted to the PCF node 206 via the PCF transmission and reception control unit 505 (step 1012).

As described above, the base station 204 generates the flow control message every predetermined flow control cycle and transmits the message to the PCF node 206. Although the flow control cycle is assumed as the order of tens m/sec to a few seconds in the embodiment, it is desirable to set the cycle as short as possible within the processing capability of the base station and the PCF node and the allowable range of a load on the network and make the cycle to follow a change in the forward link transmission rate with high accuracy. Although the case of always periodically transmitting the flow control message has been shown in the embodiment, an embodiment of promptly transmitting the flow control message in the case, for example, where a channel is assigned to a new mobile station at a time other than the predetermined cycles is also possible. An embodiment such that the flow control message is not periodically transmitted but is transmitted only when the contents of a message are changed is also possible.

The operation of the PCF node 206 will now be described.

FIG. 11 shows the configuration of the functional blocks of the PCF node 206.

In the PCF node 206, a BS transmission and reception control unit 1101 and a PDSN transmission and reception control unit 1105 control transmission paths for performing communication with a base station and the PDSN 209, respectively. A PDSN session management unit 1104 exchanges control messages 406, 407, and the like as shown in FIG. 4 with the PDSN 209, manages set-up, release, and the like of a session between the PCF node and the PDSN, and performs a GRE tunneling relay process of a user packet between the PCF node and the PDSN. The BS transmission and reception control unit 1101 and a BS-session management unit 1102 receive the flow control message from the base station. Similarly, the BS-session management unit 1102 exchanges the control messages 405 and 408 as shown in FIG. 4 and the like with the base station, manages set-up, release, and the like of the session between the PCF node and the base station, and performs the GRE tunneling relay process of the user packet between the PCF node and the base station.

A session management table 1106 is a table for managing the corresponding relation of the session between the base station and the PCF node and the session between the PCF node and the PDSN. A packet buffer 1103 is storing means for temporarily storing forward link packets destined to mobile stations in order to absorb the difference between the forward link transmission rate in the radio channel and the data transmission rate in the IP network, and assures a predetermined capacity for each session between the base station and the PCF node, that is, each packet destination mobile station. A packet management table 1107 holds a list of packets stored in the buffer 1103.

After starting the data communication service to a mobile station by the procedure show in FIG. 4, the packets destined for the mobile station are transferred from the IP network 210 to the PCF node 206 via the PDSN 209 (steps 607 and 608 in FIG. 6). In the PCF node 206, the packets are received by the PDSN transmission and reception control unit 1105 and supplied to the PDSN session management unit 1104. The packets are GRE encapsulated in the format shown in FIG. 3. The PDSN session management unit 1104 refers to the session management table 1106 on the basis of the ID of a session between the PCF node and the PDSN, which is set in the key field of the GRE header of the received packet, and specifies the destination mobile station and a destination base station of the packet.

FIG. 12A shows an example of the configuration of the session management table 1106.

The session management table 1106 in the PCF node includes a PDSN address (item 1201) of a source of packet transfer to the PCF node and a session ID (item 1202) set for each destination mobile station of a packet with the PDSN. The session ID (item 1202) is an ID set in the key field of the GRE header of the packet which is GRE tunneling transferred between the PCF node and the PDSN. As information of a session between the PCF node and the base station corresponding to the session between the PDSN and the PCF node, an address (item 1203) of the base station as the destination of the packet, an ID (item 1204) of a session between the base station and the PCF node, and an ID (item 1205) of an IMSI or the like of a destination mobile station are also included. The information is set by exchanging control messages 405 to 408 at the time of set-up of a session shown in the sequence of FIG. 4. As other information, a current buffering amount of packets (item 1207) for each destination and a sequence number (item 1208) to be given to the packet transferred next to the base station are also stored in the session management table. Each time a packet transferred from the PDSN is stored in the packet buffer 1103, the PDSN session management unit 1104 adds a packet length of the received packet to the values of items 1207 and 1208.

As shown in FIG. 12B, in the packet management table 1107, a destination mobile station ID (item 1209), sequence number (item 1210) to be given to the packet, packet length (item 1211), and an address (item 1212) of a buffer in which the packet is to be stored are set.

An operation of the PCF node 206 in the case of receiving a flow control message 611 from the base station in a state (609 in FIG. 6) where the packets destined for each mobile station are stored in the packet temporary storing buffer 1103 will now be described.

The BS session management unit 1102 of the PCF node 206 shown in FIG. 11 receives the flow control message from the base station via the BS transmission and reception control unit 1101, extracts the priority information (804 in FIG. 8) of each mobile station included in the flow control message, and sets the information as an item 1206 in the session management table 1106. The BS session management unit 1102 deletes a packet having the sequence number smaller than the sequence number (805 in FIG. 8) indicated by the flow control message from the buffer 1103 and subtracts the size of the deleted packet from the buffering amount of packets 1207 in the session management table 1106. The information regarding the deleted packet is deleted from the packet management table 1107.

The BS session management unit 1102 plays the role of transfer rate control means for reading out from the buffer 1103, if any, a packet destined for a mobile station indicated by the flow control message and transferring it to a base station at the transmission rate according to the priority notified by the flow control message (step 613 in FIG. 6).

FIG. 13 is a conceptual diagram of the transfer rate control.

In the diagram, blocks A-1 to A-7 represent packets for a mobile station A which are buffered in the PCF node 206, and blocks B-1 to B-5 represent packets for a mobile station B. Similarly, blocks C-1 to C-6, D-1 to D-3, and E-1 to E-5 represent packets for mobile stations C, D, and E, respectively. A numeral assigned to each block indicates the order of arrival at the PCF node of each of packets having the same destination. The height of each block corresponds to a packet length. The blocks have different packet lengths.

The PCF node 206 calculates the maximum amount of packets which can be transferred to the base station among the buffered packets on the basis of the following expression every flow control cycle for each destination mobile station. "average radio channel transmission rate of each mobile station" בflow control period"

The average radio channel transmission rate of each mobile station is obtained by inverse operation from the correspondence table of FIG. 9 on the basis of the priority notified by the flow control message. Since the priority of each mobile station is proportional to the average radio channel transmission rate in the example of FIG. 9, the ratio of the priority notified with respect to each mobile station and the ratio of the maximum transfer amount of packets destined for each mobile station from the PCF node 206 to the base station become equal to each other. In FIG. 13, the ratio of the priorities notified with respect to the mobile stations A, B, C, D, and E is assumed as 4:2:0:3:1. As described above, priority zero indicates a dormant state of the packet transfer. In the example, the priority of the mobile station C is zero, so that packets destined for the mobile station C are kept in the buffer of the PCF node and are not transferred to the base station.

The PCF node 206 transmits packets in the calculated range to each of the mobile stations in the flow control cycle. In FIG. 13, a thick line 1301 indicates the upper limit of the transmission amount. The packets A-1 to A-6 destined for the mobile station A, packets B-1 to B-3 destined for the mobile station B, packets D-1 to D-3 destined for the mobile station D, and packet E-1 destined for the mobile station E are transferred from the PCF node to the base station.

When it is predicated that the transfer amount of packets calculated in such a manner exceeds the amount of packets which can be transferred in the flow control cycle due to, for example, a congested state of the network or a problem in the transfer processing capability of the PCF node, the packet transfer upper limit value is decreased to the range where the packets can be transferred. In this case, the ratio of the upper limit of the transfer amount of each mobile station is not changed.

FIG. 14 shows an example of the upper limit of the packet transfer capacity after the change.

After the transfer upper limit is decreased from the level of the broken line 1301 to the level of the thick line 1401, the packets A-1 to A-4 for the mobile station A, packets for B-1 and B-2 the mobile station B, packets D-1 and D-2 for the mobile station D, and only packet E1 for the mobile station E are transferred to the base station.

Figure 15:
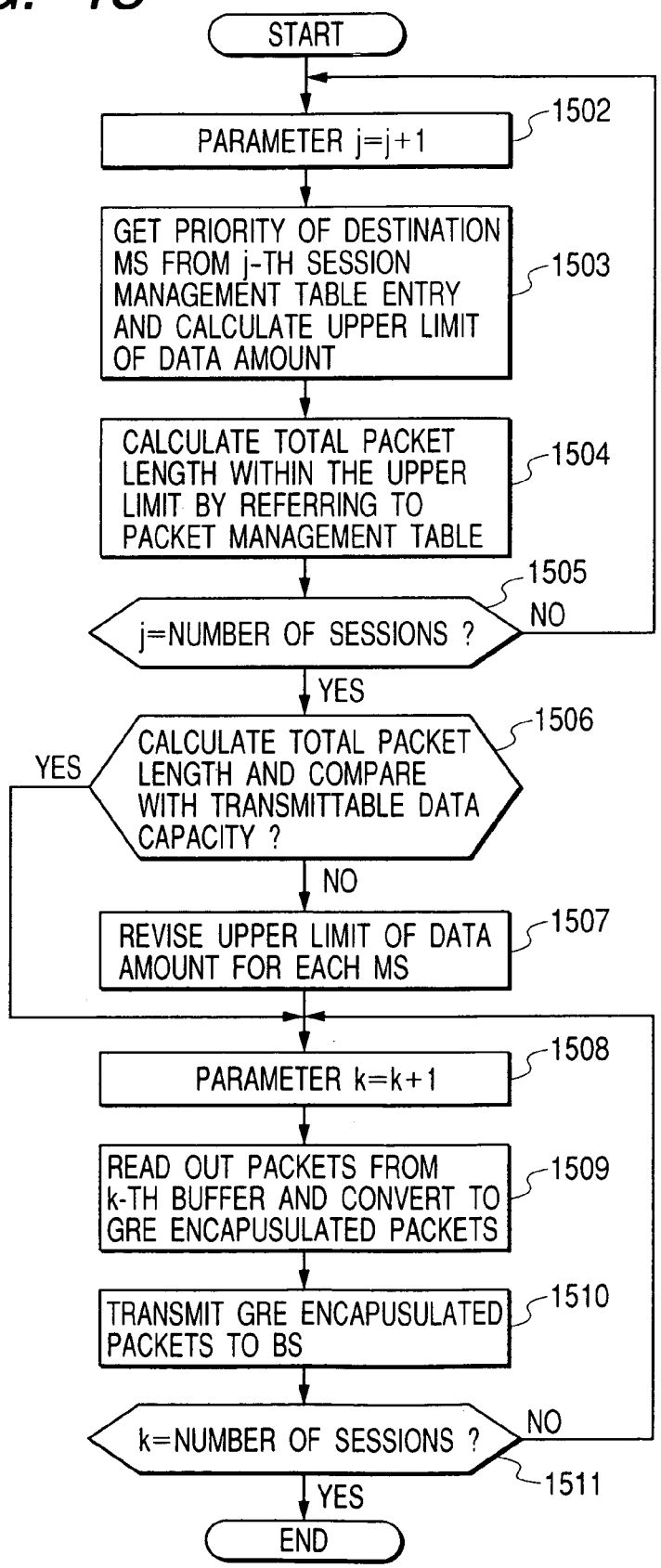
FIG. 15 is a flowchart showing a procedure of transferring a packet executed by the PCF node.

FIG. 15 is a flowchart of the above procedure.

The BS-session management unit 1102 reads out the priority information of the mobile station for each session from the session management table 1106 and calculates the upper limit of the amount of packet data to be transferred to the mobile station in the flow control cycle from the priority information and the flow control cycle (1503). Subsequently, with reference to the packet management table 1107, the BS-session management unit 1102 selects packets to be transferred within the upper limit, and calculates the total packet length (1504).

The procedures 1502 to 1505 are performed for each session, that is, every destination mobile station of packets, and a total amount of packets to be transferred to the base station is calculated in the flow control cycle (step 1506). When the total amount of packets exceeds the amount of data which-can be transmitted in the flow control cycle, the upper limit of the transfer amount of packets destined for each mobile station is corrected so that the total amount of packets becomes an amount of data which can be transferred (step 1507)

The BS-session management unit 1102 reads out packets destined for each mobile station from the buffer 1103 within the upper limit of the data transfer amount of the destination mobile station determined as described above, converts each packet to a GRE encapsulated packet by setting the session ID and the sequence number obtained by referring to the session management table 1106 and the packet management table 1107 (step 1509), and transmits the GRE encapsulated packets to the base station via the BS transmission and reception control unit 1101 (step 1510). The procedures 1509 to 1511 are executed every session, that is, for each destination mobile station of the packets.

The operation of the base station receiving the packets from the PCF node 206 will now be described.

When the GRE encapsulated packet is received from the PCF node 206 via the PCF transmission and reception control unit 505, the base station 204 shown in FIG. 5 specifies the destination mobile station and a channel as assigned to the destination mobile station by referring to the session management table 506 on the basis of the session ID extracted from the key field 306 of the GRE header of the received packet in the PCF session management unit 504, and stores the received packet to the buffer 503 for the specified channel.

The sequence number (307 in FIG. 3) set in the packet and the next sequence number (item 706 in FIG. 7) in the session management table 506 are compared with each other. When the sequence number 307 and the next sequence number 706 are the same, the packet length of the received packet is added to the next sequence number 706. When the sequence number 307 and the next sequence number 706 are not the same, it is considered that a packet dropout occurs during the transfer, and the next sequence number is not updated.

In any of the cases, the value of the next sequence number 706 in the session management table 506 is notified to the PCF node by the flow control message of the next time, and the packet of the sequence number and the subsequent packets are re-transmitted from the PCF node. Since there is a case such that the disparity between the sequence number 307 and the next sequence number 706 is not due to the packet dropout but a simple disorder of arriving packets, the sequence number can be checked in a relatively long time of about the flow cycle.

The MS session management unit 502 reads out packets from the buffer 503 and transmits them to the mobile station via the radio transmission and reception control unit 501. The transmission rate is according to the value of the latest transmission rate designated by the mobile station. When the transmission of packets is completed, the MS session management unit 502 deletes the transmitted packets from the buffer 503 and subtracts the packet length from the used buffer area (item 705 in FIG. 7) in the session management table.

Figure 16:
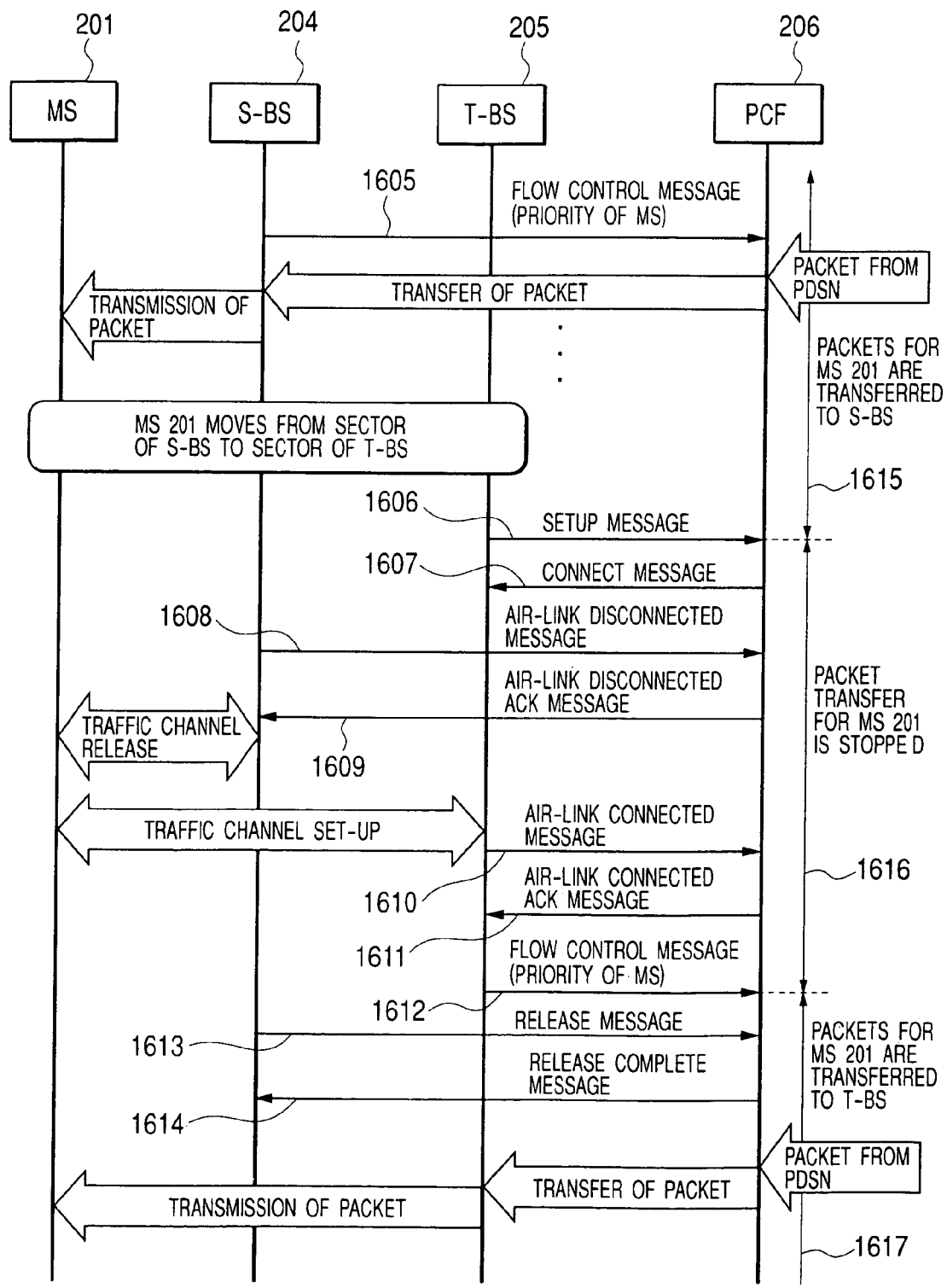
FIG. 16 is a sequence chart for explaining a handoff sequence.

A sequence of handoff that a mobile station moves to an area controlled by another base station will now be described with reference to FIG. 16. In FIG. 16, messages other than the flow control message are conformed with cdma 2000 standardized document 3GPP2.A. S0001 of 3GPP2.

In FIG. 16, it is assumed that the mobile station 201 is in the radio sector managed by the base station (S-BS) 204 and packets are received through a traffic channel assigned by the S-BS 204. In this case, the priority information regarding the mobile station 201 is included in a flow control message 1605 sent from the S-BS 204 to the PCF node 206. After that, when the mobile station 201 moves in a radio sector managed by a base station (T-BS) 205, a control message 1606 for notifying the ID of the mobile station and a new session ID is transmitted from the T-BS 205 to the PCF node 206.

The PCF node 206 updates the session ID (item 1204 in FIG. 12) of the mobile station in the session management-table 1106, and sets the priority (item 1206) to zero, thereby stopping the packet transfer to the S-BS 204 and just buffering packets destined for the mobile station 201. After that, when a new traffic channel is established between the mobile station 201 and the T-BS 205 and the priority information of the mobile station 201 is included in a flow control message 1612 received from the T-BS 205, the PCF node 206 re-starts the operation of transferring packets destined for the mobile station 201 via the T-BS 205 in accordance with the priority indicated by the flow control message.

As described above, by buffering the packets for the mobile station 201 in the PCF node 206 without transferring them to any of the base stations during a handoff period 1616 shown in FIG. 16, a packet dropout during the handoff can be avoided. In the HDR (1×EV) system as the precondition of the embodiment, in order to save the radio resources, when a predetermined time elapses before the mobile station uses the assigned radio channel, the mobile station is regarded that it is in the dormant mode in which the packet transmission/reception is not performed, and the assigned channel is released.

Figure 17:
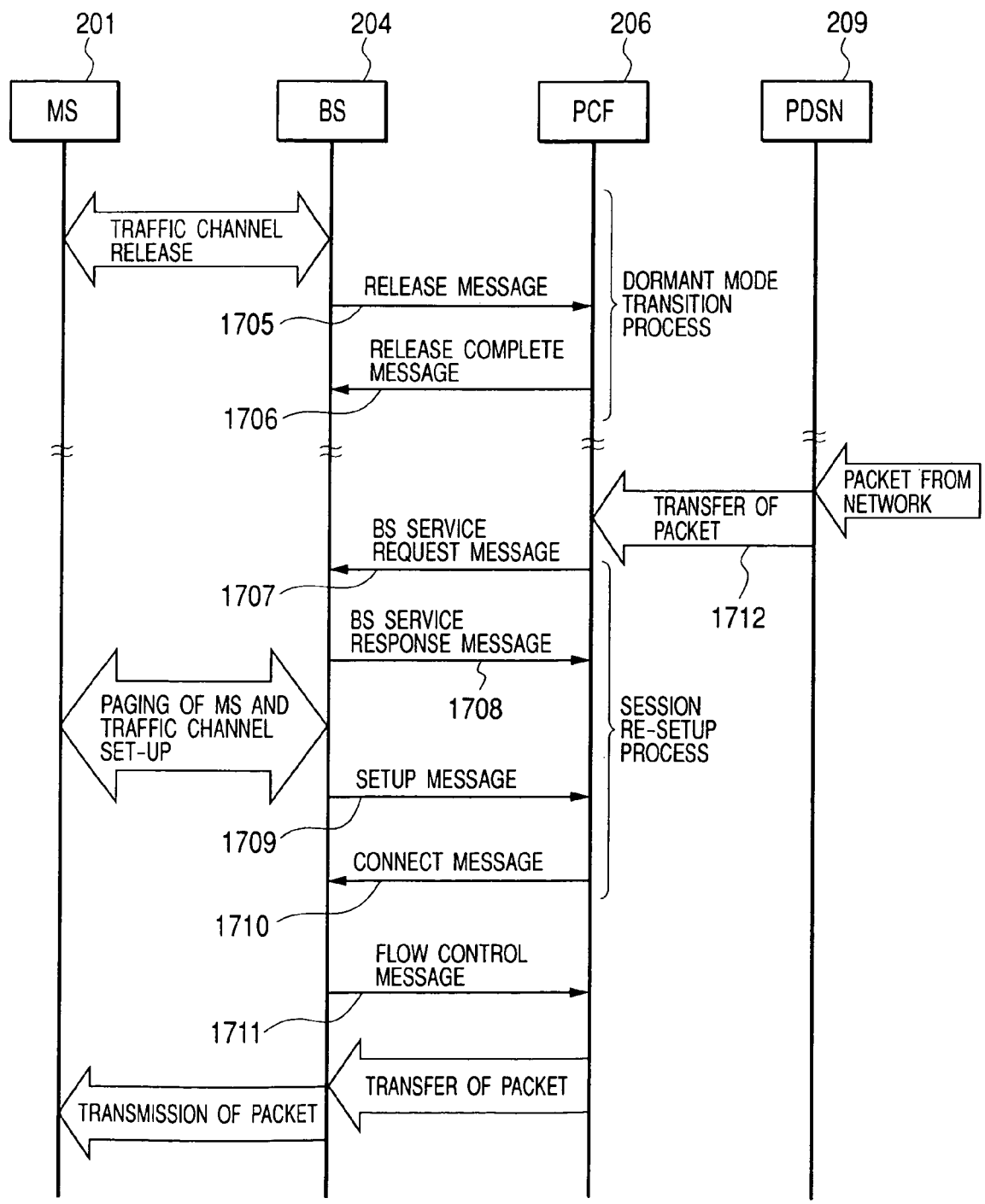
FIG. 17 is a sequence chart showing a procedure of shifting to a dormant mode and re-setting a session.

FIG. 17 shows a sequence for shifting to the dormant mode.

In this case, control messages 1705 and 1706 are exchanged between the BS 204 and the PCF node 206, and the PCF node 206 deletes information (items 1203 and 1204 in FIG. 12) regarding the session between the BS 204 and the PCF node 206 corresponding to the mobile station 201, and changes the priority (item 1206 in FIG. 12) to zero. After that, when a packet destined for the mobile station 201 in the dormant mode is transferred from the PDSN 209 (step 1712), the PCF node 206 transmits a control message 1707 to the base station 204, and starts a process of re-setting the session for the mobile station 201 between the PCF node 206 and the BS 204 (steps 1709 and 1710).

Until the priority information of the mobile station 201 is notified by the flow control message 1711, the packets for the mobile station 201 are buffered by the PCF node 206. With the configuration, until the radio channel is set up again between the mobile station and the base station, the packets transferred from the IP network side are not discarded but buffered. When the radio channel is set up again, the packets are transferred to the mobile station.

The configuration of hardware to realize the above-described functions will now be described.

Figure 18:
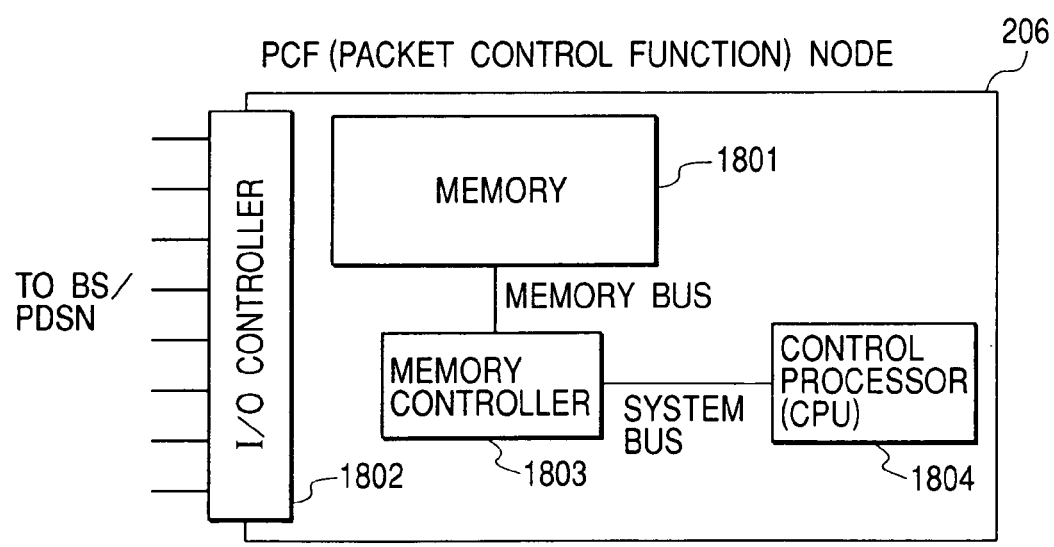
FIG. 18 is a block diagram showing an example of the hardware configuration of the PCF node.

FIG. 18 shows an example of the hardware configuration of the PCF node 206.

The PCF node 206 is constructed by an I/O controller 1802 for transmitting and receiving data to and from the base station and the PDSN, a memory 1801 for storing packets and control programs, a memory controller 1803 for accessing the memory at high speed, and a control processor (CPU) 1804 for controlling those components.

The packet buffer 1103, session management table 1106, and packet management table 1107 shown in FIG. 11 are formed on the memory 1801. The PDSN transmission and reception control unit 1105 and the BS transmission and reception control unit 1101 are mounted on the I/O controller 1802. The functions of the BS session management unit 1102 and the PDSN session management unit 1104 are realized by the program stored in the memory 1801 and the control processor (CPU) 1804 for executing the program.

Figure 19:
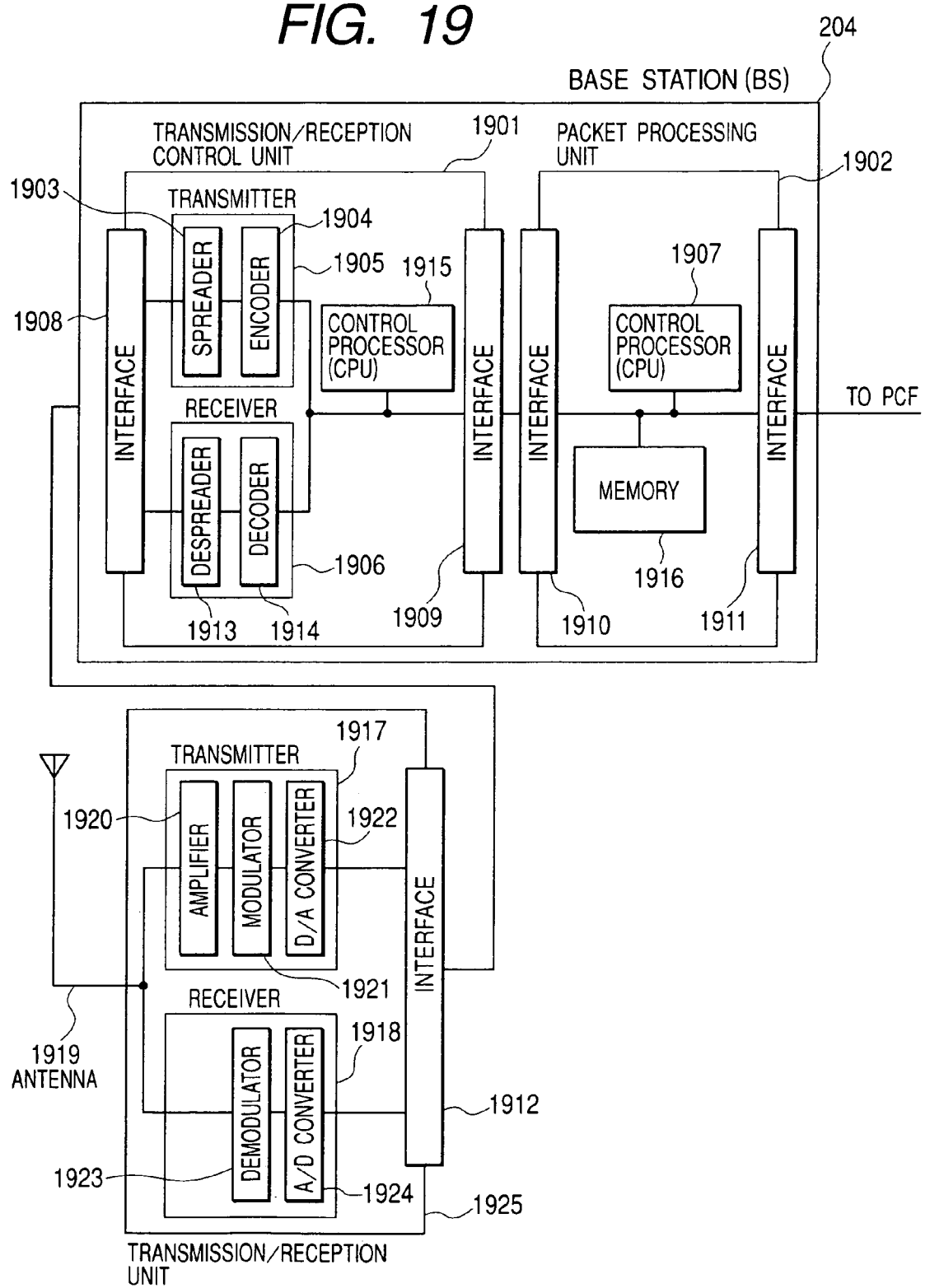
FIG. 19 is a block diagram showing an example of the hardware configuration of a base station.

FIG. 19 shows an example of the hardware configuration of the base station 204. The base station 204 shown here is constructed by a transmission/reception control unit 1901, a packet processing unit 1902, and a transmitting/receiving unit 1925.

The packet processing unit 1902 is constructed by an interface 1911 for controlling communication with the PCF node, an interface 1910 for transmitting and receiving data to and from the transmission/reception control unit 1901, a memory 1916 for storing packets and a control program, and a control processor (CPU) 1907. The packet buffer 503 and the session management table 506 shown in FIG. 5 are formed on the memory 1916. The PCF transmission and reception control unit 505 is mounted on the interface 1911, and the MS session management unit 502, PCF session management unit 504, and timer 507 are realized by the program stored in the memory 1916 and the control processor (CPU) 1907 for executing the program.

The transmission/reception control unit 1901 is to realize the function of the radio transmission and reception control unit 501 shown in FIG. 5, and is constructed by a transmitter 1905, a receiver 1906, a control processor (CPU) 1915 for controlling the transmitter 1905 and receiver 1906, and an interface 1908 with the transmitting/receiving unit 1925. The transmitter 1905 includes an encoder 1904 for encoding and interleaving transmission data, and a spreader 1903 for spreading data by a spreading code. The receiver 1906 includes a despreader 1913 for despreading received data, and a decoder 1914 for decoding the despread data. The transmitting/receiving unit 1925 having an antenna 1919 is connected to the transmission/reception control unit 1901.

A second embodiment of the invention will now be described.

Figure 20:
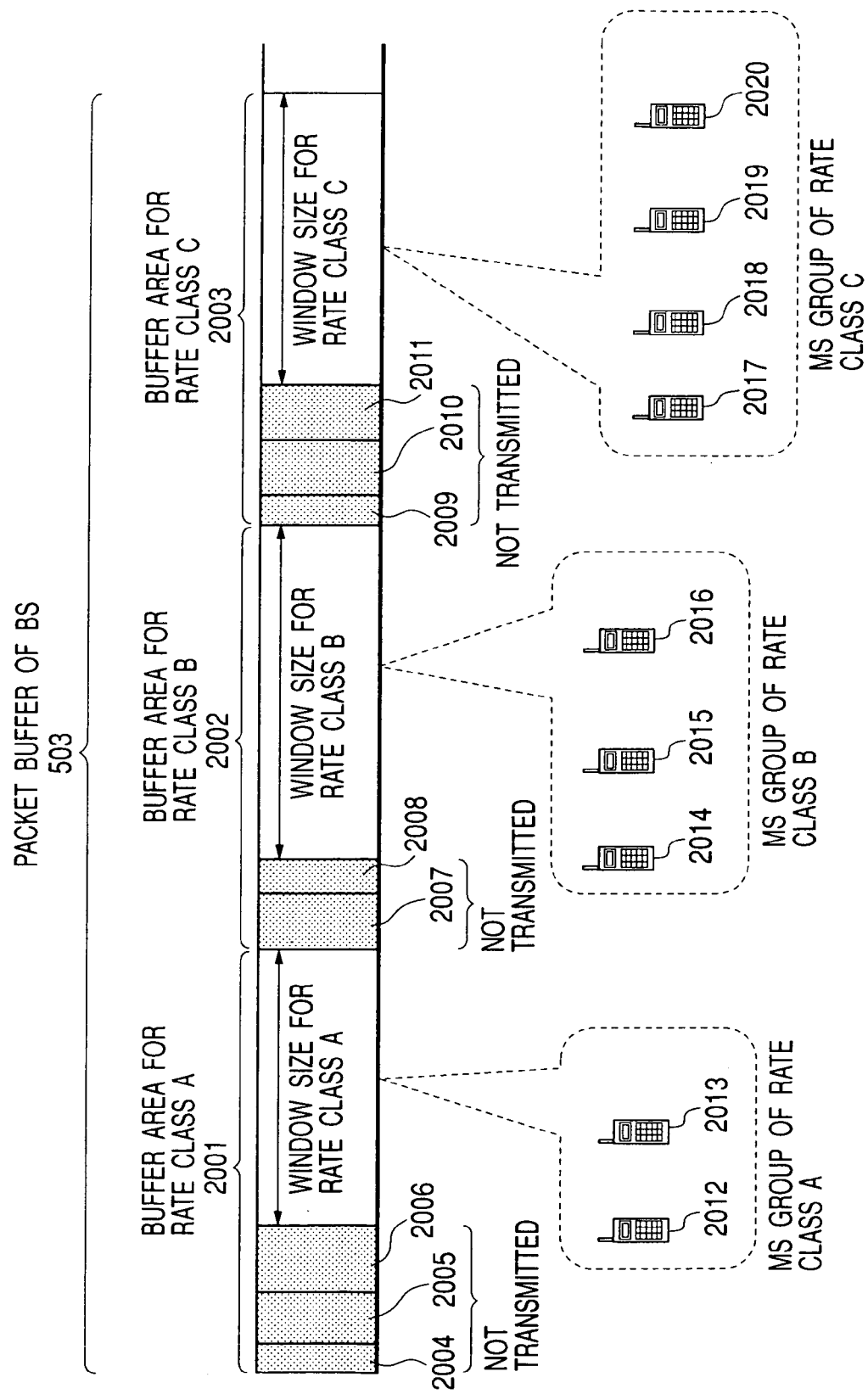
FIG. 20 is a diagram for schematically explaining a second embodiment of the packet transfer control according to the invention.

FIG. 20 shows an outline of the second embodiment of the invention. In the second embodiment, mobile stations are grouped into rate classes according to current average values of the forward link transmission rates. In the base station 204, buffers for temporarily storing packet data to be transmitted to mobile stations are assigned to each of the groups. A packet transferred from the PCF node to the base station is temporarily stored in a buffer assigned to the group to which the destination mobile station of the packet belongs.

Each the time the received packet from the PCF node 206 is stored, the free space of the buffer in the base station decreases. When the transmission of packets to the mobile station is completed, the free space of the buffer increases. In the second embodiment, the base stations 204 and 205 notify the PCF node 206 of the free space of the buffer in each of the groups as "window size", thereby performing the flow control of the packet transfer from the PCF node 206 to each of the base stations.

For example, in FIG. 20, when it is assumed that the base stations 2012 and 2013 belong to a rate class A, packets destined for the mobile stations, which are transferred from the PCF node 206 are temporarily stored in a buffer area 2001 assigned to the group of the rate class A in the buffer 503 of the base station. When it is assumed that packets 2004, 2005, and 2006 remain untransmitted in the buffer area 2001, the base station 204 calculates a value obtained by subtracting the size of the packets 2004 to 2006 from the size of the buffer area 2001 as the window size of the rate class A, and instructs the PCF node 206 to transfer the packets destined for the mobile stations belonging to the rate class A not more than the window size by the flow control message.

Figure 21:
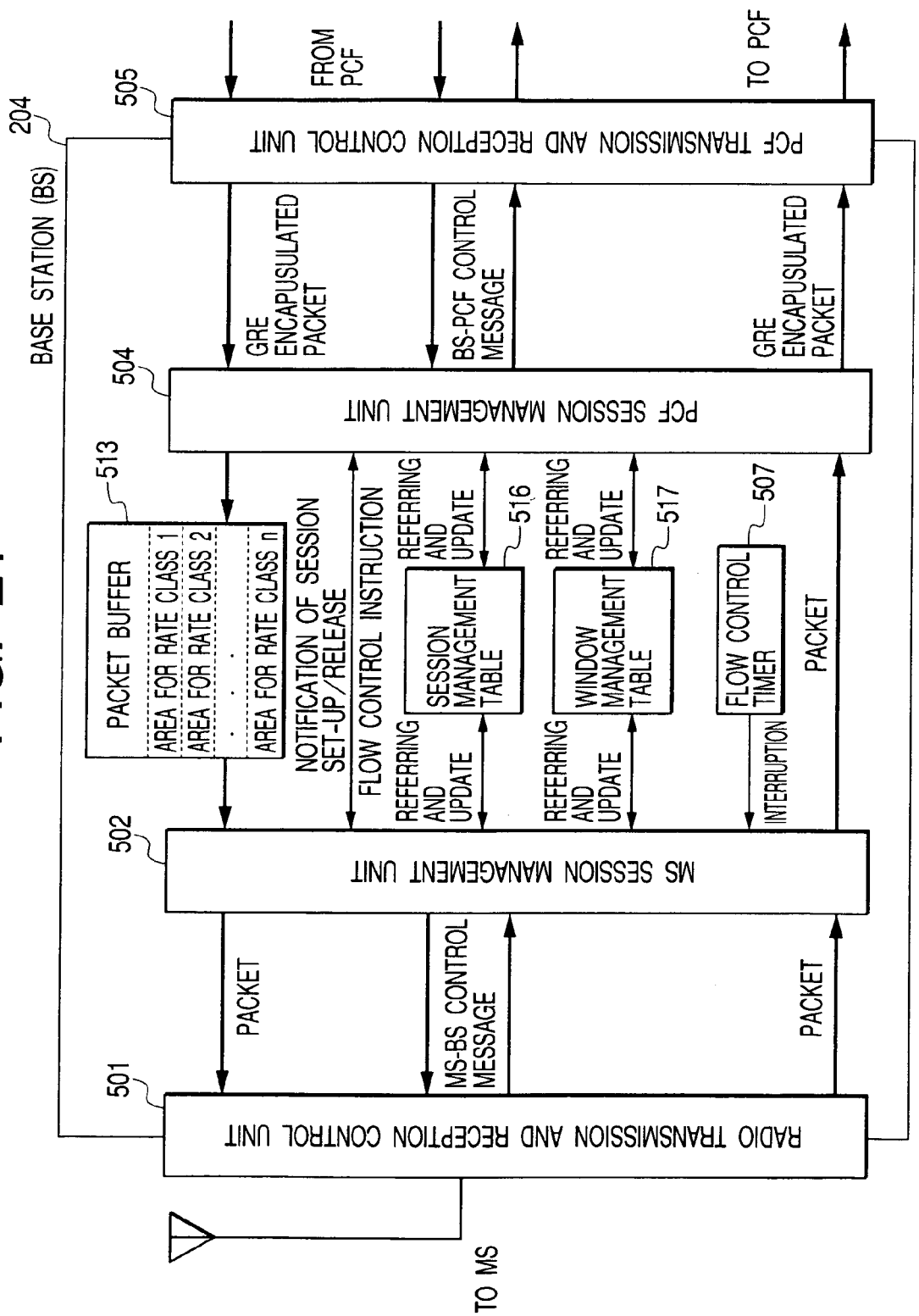
FIG. 21 is a functional block diagram showing a second embodiment of the base station.

FIG. 21 shows the configuration of the functional blocks of the base station 204 according to the second embodiment.

The base station of the second embodiment has, basically, components similar to those of the first embodiment and has, as a new component, a window management table 517 for managing the window size and the other information. In the second embodiment, the packet buffer 513 is divided in rate classes. The buffer size assigned to each group may vary according to groups (rate classes) on the basis of the average transmission rate of each group and the number of mobile stations belonging to the group, that is, a distribution state of each transmission rate.

In a manner similar to the first embodiment, the radio transmission and reception control unit 501 of the base station calculates the average of a required value of the forward link transmission rate reported by a control message from each mobile station or a signal on a DRC channel for each flow control cycle and sets the calculated average in a session management table 516. The PCF session management unit 505 has, as shown in FIG. 22, a rate class division table 220 defining the relation between an average value 221 of transmission rate in the radio channel and a level 222 of rate class, and divides the mobile stations into groups according to the rate classes 222 with reference to the table 220 on the basis of the average values of the radio channel transmission rates of the mobile stations calculated every flow control cycle.

A group of mobile stations is properly re-constructed every flow control cycle. When a new traffic channel is assigned to the mobile station and the average value is not calculated yet, the mobile station is added to the group of the rate class according to the transmission rate notified at that time point. As shown in FIG. 17, when the mobile station enters the dormant mode and the traffic channel is released, since the mobile station is eliminated from the group to which the mobile station has belonged to, the mobile station does not belong to any groups.

In order to group the mobile stations, other than a method of considering only the average of the forward link transmission rates, there is, for example, a method of reflecting a change in transmission rate (influenced by a moving direction or the like of a mobile station with respect to the base station) by using, for example, a value obtained by the following expression, "required rate at the time point"÷"average transmission rate until then"

thereby improving the radio state and adding the mobile station to a group of a higher rate class. The expression is known as proportional fairness scheduling for determining priority of transmission in the radio channel, which may be reflected in the rate of the packet transfer from the PCF node to the base station of the invention. The information of each group is stored in the session management table 516 in FIG. 21.

FIG. 23A shows the configuration of the session management table 516 of the base station.

The session management table 516 includes, for each mobile station, a session ID (item 2301) determined between the base station and the PCF node for packet transfer, an ID (item 2302) of the mobile station such as IMSI, a traffic channel ID (item 2303) currently assigned to the mobile station, the above-described average forward link transmission rate (item 2304), and a rate class (item 2305) to which the mobile station belongs at present. The session ID (item 2301) is a set value in the key field of the GRE header of a packet in a GRE encapsulated packet transfer between the base station and the PCF node.

As shown in FIG. 23B, in the window management table 517, in correspondence with a destination base station address (item 2306), at each level (item 2307) of the rate class, a window size (item 2308) and a sequence number (item 2309) of a packet which is destined for a mobile station belonging to the rate class and is to be transferred next from the PCF node are stored. In the window size 2308, the free capacity in the buffer area 2103 assigned to the rate class is set.

Figure 24:
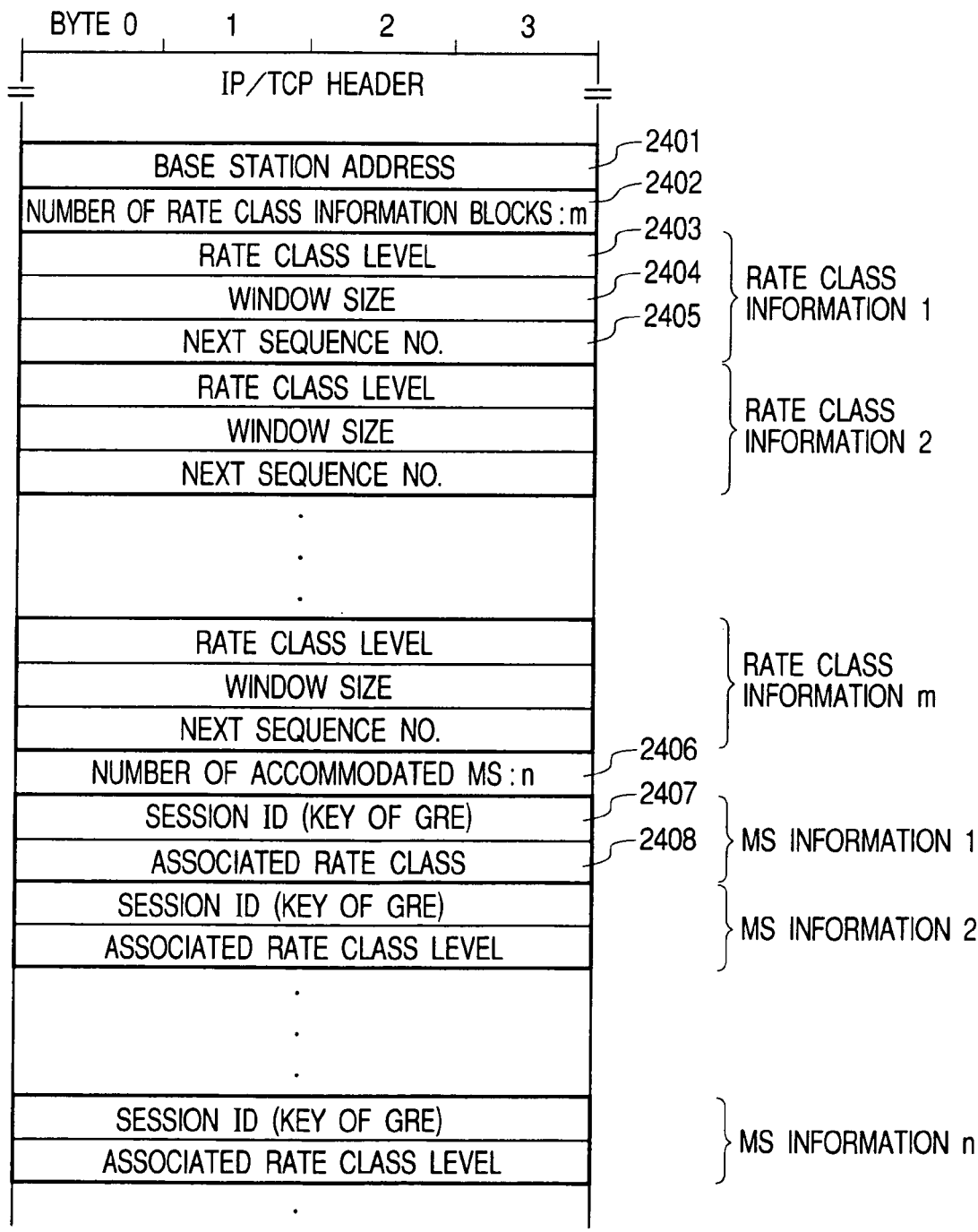
FIG. 24 is a diagram showing the format of a flow control message generated by the base station of the second embodiment.

The PCF session management unit 504 in FIG. 21 generates a flow control message by using the information. FIG. 24 shows the contents of the flow control message.

In the second embodiment, the flow control message includes the information of each rate class shown in FIG. 22. The class information includes a rate class level 2403, a window size 2404 indicative of a free space in the buffer in the base station assigned to the class, and a sequence number 2405 of a packet to be received next by the base station from the PCF node. The flow control message includes a plurality of blocks (for example, 9 blocks in the grouping in FIG. 22) of class information, and the number of blocks of class information is set in the number field 2402 of rate class information blocks. The flow control message further includes a session ID (key of the GRE header) 2407 corresponding to the mobile station as information of each mobile station to which the radio channel is assigned by the base station, and a rate class level 2408 to which the mobile station belongs at present. The number of blocks of the mobile station information included is set in a field 2406 of the number of accommodated mobile stations.

Figure 25:
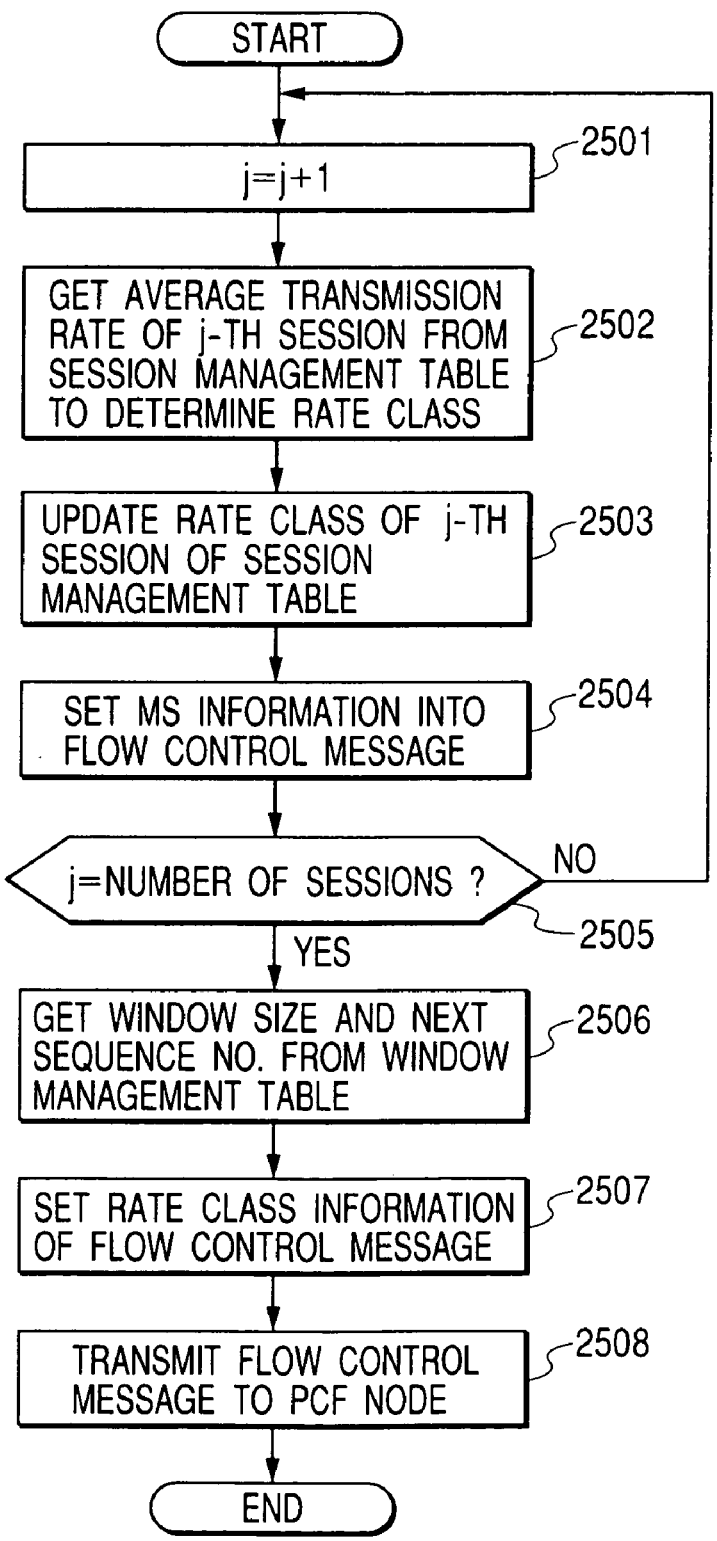
FIG. 25 is a flowchart showing the procedure of generating the flow control message in the second embodiment.

FIG. 25 is a flowchart of processes of the PCF session management unit 504 for generating and transmitting the flow control message.

The PCF connection management unit 504 receives an instruction of transmitting the flow control message from the MS session management unit 502 every flow control cycle. For each active session, that is, each mobile station to which a radio channel is assigned, the PCF connection management unit 504 first obtains the average forward link transmission rate from the session management table (step 2502), determines the rate class by referring to the rate class division table 220 shown in FIG. 22, updates the session management table 516 (step 2503), and sets the rate class in the flow control message (step 2504). The PCF connection management unit 504 gets the current window size of each rate class and the sequence number of a packet to be received next (step 2506), sets the sequence number as rate class information to the flow control message (step 2507), and transmits the flow control message to the PCF node via the PCF transmission and reception control unit 505 (step 2508).

The processing operation on the PCF node side which receives the flow control message will now be described.

Figure 26:
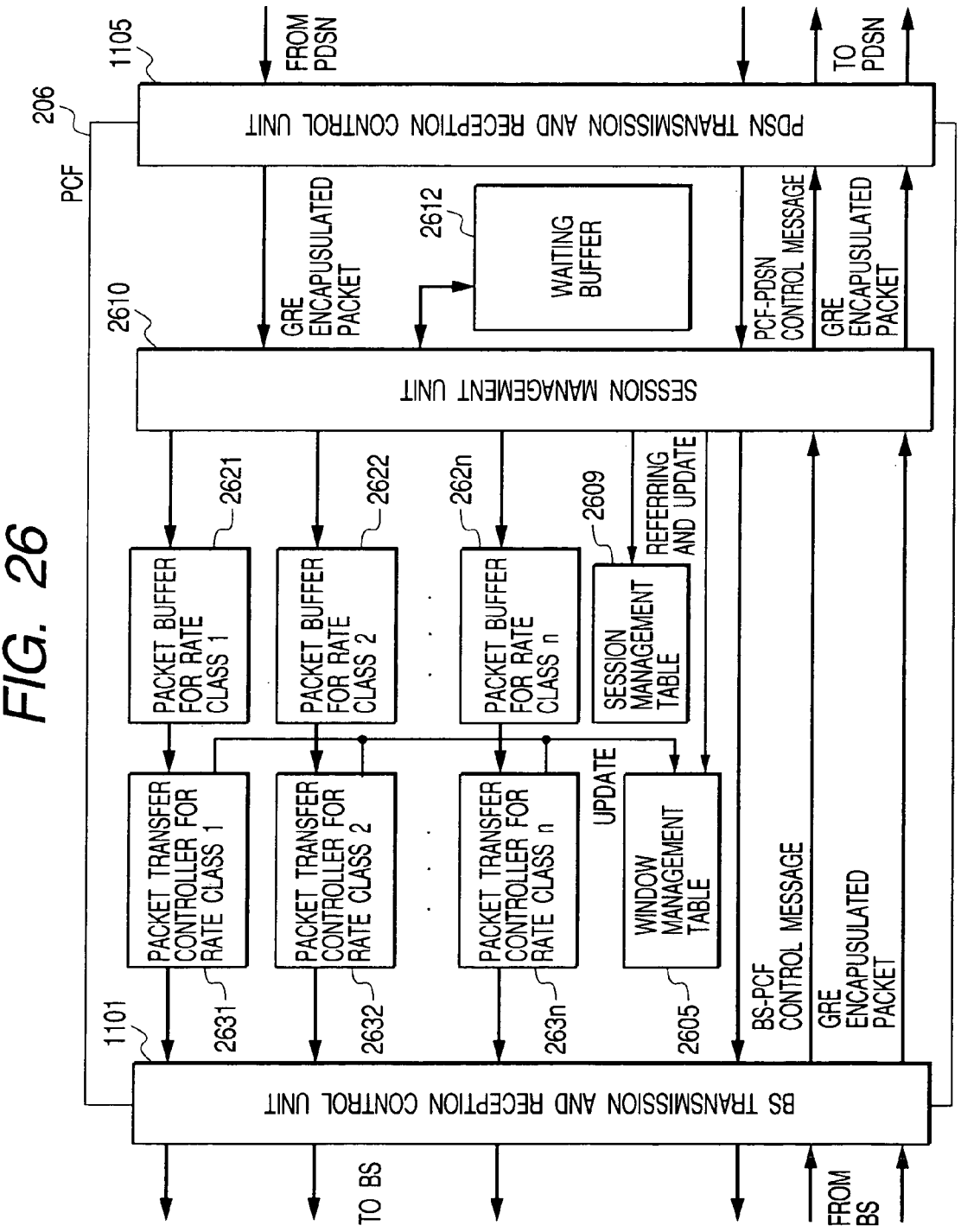
FIG. 26 is a functional block diagram showing a second embodiment of a PCF node.

FIG. 26 shows the configuration of functional blocks of the PCF node 206 in the second embodiment.

In the PCF node 206, the BS transmission and reception control unit 1101 and the PDSN transmission and reception control unit 1105 controls a transmission path used by each PCF node to perform communications with the base station and the PDSN. The session management unit 2610 exchanges the control messages shown in FIG. 4 with the base station and the PDSN, thereby managing the session among the base station, PCF node and PDSN and performs a relaying process for tunneling-transferring a GRE encapsulated packet destined for a mobile station among them.

In the second embodiment, packets are buffered in packet buffers 262i (i=1 to n) corresponding to base stations as destinations and rate classes (i) to which destination mobile stations belong. The packets are subjected to parallel processes by packet transfer management units 263i (i=1 to n) which operate parallel with each other for the corresponding base stations as destinations and rate classes. The PCF node 206 has a session management table 2609 for associating a session between the PDSN 209 and the PCF node 206 with a session among the PCF node 206, a base station, and a mobile station and for managing the state of each session, and a window management table 2605 for managing the packet transfer status for each rate class. The PCF node 206 also has a buffer 2612 for temporarily storing a packet for which destination base station, session ID and rate class are not determined yet since the destination mobile station is in the dormant mode and a session has not been set up between the PCF node and the base station.

A session management unit 2610 which receives the flow control message from the base station via the BS transmission and reception management unit 1101 stores a corresponding list of a mobile station and a rate class and window size information of each rate class included in the received message into the session management table 2609 and the window management table 2605. When the window size of a rate class (i) is updated according to the flow control message, the packet transfer management unit 263i corresponding to the rate class (i) is notified of the updating of the window size.

FIGS. 27A and 27B show the configuration of the session management table 2609 and the configuration of the window management table 2605 of the PCF node in the second embodiment, respectively.

The session management table 2609 includes, as session information of each packet destination mobile station, a source PDSN address (item 2701), a session ID between PCF and PDSN (item 2702), a base station address (item 2703) as a packet transfer destination, and a session ID between BS and PCF (item 2704). The values of these items are set at the time of start of data communication service by exchanging the control messages shown in FIG. 4. In the session management table 2609, rate classes (item 2705) of mobile stations notified by the flow control message are stored.

In the window management table 2605, in correspondence with an address (item 2706) of the base station as the destination of packets and a rate class (item 2707), a window size (item 2708) notified by the flow control message and a sequence number (item 2709) of a packet to be transferred next are set. Other than the above, in the window management table 2605, a current buffering amount of packets in the buffers 262i corresponding to the rate class (i) is stored.

The packet transferring operation of the PCF node 206 in the second embodiment will now be described.

FIG. 28 is a flowchart of processes of the session management unit 2610 in FIG. 26.

When a GRE encapsulated packet transferred from the PDSN is supplied to the session management unit 2610 via the PDSN transmission and reception control unit 505, the session management unit 2610 performs a process of decapsulating the received packet such as elimination of the GRE header (step 2801), and retrieves the destination mobile station of the packet from the session management table on the basis of the session ID of the GRE header (step 2802). When the mobile station is in the dormant mode and there is no information of a session between the PCF node and the base station related to the destination mobile station in the session management table, in order to urge set-up of a session, a request is sent to the base station to set up a session by the control message 1707 in FIG. 17 (step 2808), and the received packet is temporarily stored in the buffer 2612 which waits for set-up of a session (step 2809).

When the session corresponding to the received packet already exists, the received packet is again converted to a GRE encapsulated packet destined for the base station by using the session ID and other information obtained from the session management table (step 2803). By referring to the window management table 2605, the buffering packet amount of the buffer 262i in the PCF node corresponding to the destination base station and the rate class (i) is obtained (step 2804). When there is a free space in the buffer, the received packet is stored in the buffer 262i of the corresponding rate class, and the buffering amount value (item 2710 in FIG. 27) in the window management table 2605 is updated according to the packet size of the received packet (step 2806). When there is no free space in the buffer, the received packet is discarded (step 2807).

When there is notification of set-up of a session from the base station, concretely, the control message 1709 in FIG. 17 is received in response to the request of set-up of a session to the base station, a new session ID notified by the control message is stored in the session management table. After that, when the flow control message is received, the packet destined to a mobile station of which rate class j is newly determined is read out from the buffer 2612 for waiting for the session set-up, converted to a GRE encapsulated packet, and the resultant is stored in the buffer 262j corresponding to the rate class j.

FIG. 29 is a flowchart showing operations of the packet transfer management units 263i (i=1 to n) in the case where a new packet is stored in the buffer or the case where a notification of change in the window information is received from the session management unit 2610.

The packet transfer management unit 263i refers to the window management table 2605 (step 2901) and checks whether the sequence number notified by the flow control message from the base station has been updated or not (step 2902). Since the updating of the sequence number denotes that the packets up to the sequence number have normally transferred to the base station, the packet transfer management unit 263i deletes the normally transfer red packets from the buffer 262i (step 2903) and, after that, checks whether a packet following the sequence number exists in the buffer or not. If the following packet exists, whether the packet size is shorter than the designated window size or not is checked (step 2904). When the following packet exists in the buffer and its packet size is shorter than the window size, the packet is transferred to the base station via the BS transmission and reception control unit 501 (step 2905). After that, the size of the transmitted packet is subtracted from the value of the window size (item 2708 in FIG. 27) in the window management table, and is added to the value of the next sequence number (item 2709 in FIG. 27) (step 2906). After that, the program returns to step 2904 in which whether the packet following the sequence number exists in the buffer or not is checked and, when it exists, a transfer process similar to the above is repeated.

The operation of the base station 204 at the time of receiving a packet from the PCF node 206 will now be described.

Figure 30:
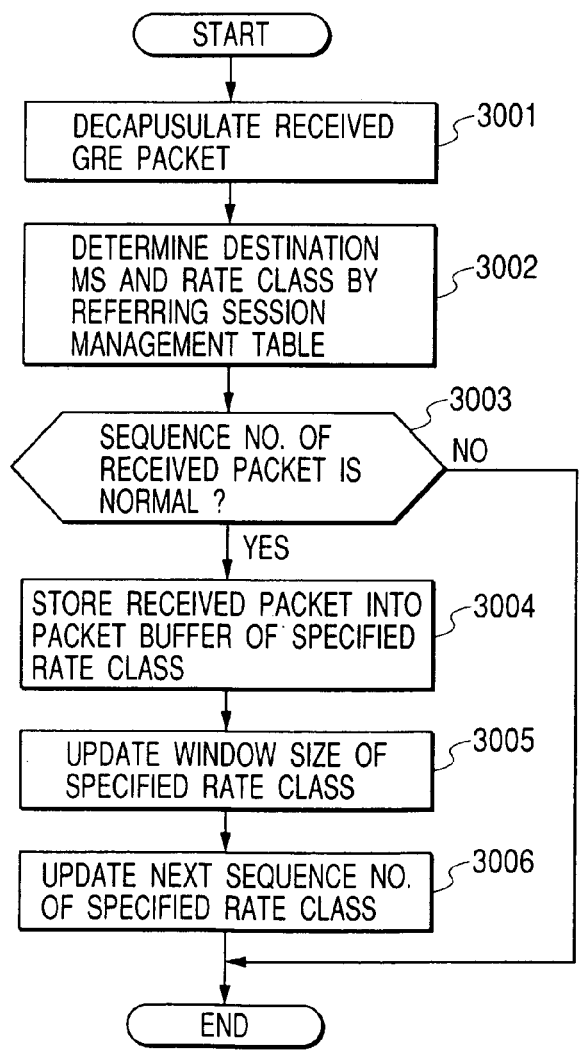
FIG. 30 is a flowchart showing a window size updating process executed by a PCF session management unit in the base station of the second embodiment.

FIG. 30 is a flowchart showing the operations of the PCF session management unit 504.

When the GRE encapsulated packet destined for a mobile station is received via the PCF transmission and reception control unit 505 shown in FIG. 21, the PCF session management unit 504 decapsulates the received packet and extracts a session ID from the GRE header (step 3001). The PCF session management unit 504 refers to the session management table 516 on the basis of the session ID, and determines the destination mobile station and the rate class (i) of the mobile station (step 3002).

The value of the next sequence number (item 2308 in FIG. 23B) in the window management table 517 and the sequence number (307 in FIG. 3) set in the GRE header of the packet are compared with each other (step 3003). When they coincide with each other, the packet is stored in the packet buffer 513 (step 3004). The packet size of the received packet is subtracted from the window size (item 2308 in FIG. 23B) corresponding to the rate class (i) in the window management table 517 (step 3005), and the packet size of the received packet is added to the value of the next sequence number (item 2309 in FIG. 23B) in the window management table 517 (step 3006).

When the sequence number set in the GRE header is larger than an expected number, that is, the next sequence number (item 2308 in FIG. 23A) in the session management table 516, it is considered that a packet dropout occurs during the transfer. In this case, the next sequence number in the window management table is not updated. Consequently, in the field of the next sequence number in the next flow control message, the not-updated value is set, so that the dropped packet is retransmitted from the PCF node. As described in the first embodiment, a simple disorder may occur in the arriving order of packets, so that the sequence number may be checked after elapse of time of about flow cycle.

Figure 31:
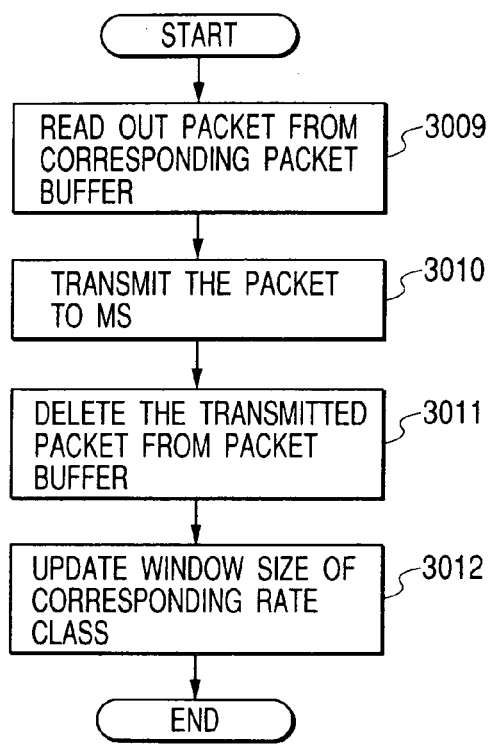
FIG. 31 is a flowchart showing a packet transfer process executed by an MS session management unit in the wireless base station of the second embodiment.

On the other hand, as shown in the flowchart of FIG. 31, the MS session management unit 502 sequentially reads out the packets stored in the buffer 513 (step 3009), and transmits them to the mobile station via the radio transmission and reception control unit 501 (step 3010). In this case, irrespective of the rate class to which a mobile station belongs at present, the value of the latest transmission rate required by the mobile station is used. The MS session management unit 502 deletes the packets which have been transmitted to the mobile station from the buffer 513 (step 3011), and adds the packet length to the window size (item 2308 in FIG. 23B) in the window management table 517 (step 3012). The updated window size of each rate class and the sequence number to be received next are notified to the PCF node by the next flow control message.

Although the flow control message is periodically transmitted in the embodiment, when a change occurs in the list of mobile stations belonging to each group at a timing other than the periodical transmission timings, the flow control message may be irregularly transmitted upon occurrence of the change.

The second embodiment can be carried out by a hardware configuration similar to that of the first embodiment, and the PCF node in the second embodiment has, for example, the hardware configuration of FIG. 18.

In the function blocks of the PCF node 206 in the second embodiment shown in FIG. 26, packet buffers 2621 to 262n for respective rate classes, waiting buffer 2612, session management table 2609, and window management table 2605 are formed in the memory 1801 in FIG. 18. The PDSN transmission and reception control unit 505 and the BS transmission and reception control unit 501 are mounted on the I/O controller 1802 in FIG. 18. The functions of the session management unit 2610 and the packet transfer controllers 2631 to 263n for respective rate classes are realized by the program stored in the memory 1801 in FIG. 18 and the control processor (CPU) 1804 for executing the program.

The base station of the second embodiment is realized by a configuration similar to that of the hardware of the first embodiment shown in FIG. 19. The window management table 517 in FIG. 21 is formed on the memory 1916 in FIG. 19 in a manner similar to the session management table 516, and the correspondence between the other function blocks and the hardware is similar to that of the first embodiment.

As described above, according to the invention, packets of a proper amount adapted to the forward link transmission rate of each radio channel are transferred from the PCF node to the radio station, so that a packet dropout due to overflow of the buffer in the base station can be prevented. Also in the case where the transmission capability of the radio channel dynamically changes, the capability can be maximally utilized, and the throughput of the whole system can be improved.

What is claimed is:

1. A packet transfer apparatus connected between a communication network and a plurality of base stations each of which conducts communications with a plurality of mobile stations via radio channels, for transferring packets received from said communication network to one of said base stations accommodating a plurality of destination mobile stations of the received packets, comprising:
   storing means for storing packets received from said communication network correlating the packets with each of the destination mobile stations;
   receiving means for receiving a control message from each of said base stations periodically, the control message including transfer rate information of packet transmission between the base station and each of mobile stations under control of the base station; and
   control means for reading out packets destined for specific mobile stations from said storing means in accordance with the contents of the control message received by said receiving means and transmitting the packets to the base station to which the specific mobile stations are connected;
   a transmission and reception control unit connected to said base station; and
   a base station session management unit for extracting said transfer rate information of each mobile station from said control message received by said receiving means.

2. A packet transfer apparatus connected between a communication network and a plurality of base stations each of which conducts communications with a plurality of mobile stations via radio channels, for transferring packets received from said communication network to one of said base stations accommodating a plurality of destination mobile stations of the received packets, comprising:
   storing means for storing packets received from said communication network correlating the packets with each of the destination mobile stations;
   receiving means for receiving a control message from each of said base stations periodically, the control message including transfer rate information of packet transmission between the base station and each of mobile stations under control of the base station; and control means for reading out packets destined for specific mobile stations from said storing means in accordance with the contents of the control message received by said receiving means and transmitting the packets to the base station to which the specific mobile stations are connected, wherein said control means has a base station session management unit for reading out packets destined for a specific mobile station indicated by said control message from said storing means and transmitting the packets to the base station to which the specific mobile station is connected at a transfer rate designated by said control message.

3. A wireless communication system comprising a plurality of base stations each for performing communication with a plurality of mobile stations in their control areas via radio channels, and a packet transfer apparatus connected between said plurality of base stations and a communication network, wherein each of said base stations has means for receiving from each of mobile stations in the control area a notification of a transmission rate calculated based on a signal received from the base station, and means for periodically generating a control message for designating a packet transfer rate for each mobile station, and transmitting the control message to said packet transfer apparatus, and said packet transfer apparatus has means for storing packets received from said communication network for each destination mobile station, and selectively transferring the packets to each of said base stations at a packet transfer rate peculiar to the destination mobile station designated by the control message, wherein each of said base stations has means for transmitting a notification message to said packet transfer apparatus when handover of a mobile station occurs from one of neighboring base stations to the base station, the message indicating that said mobile station has moved in the control area of the base station, and said packet transfer apparatus has means for interrupting transfer of packets destined for said mobile station to said neighboring base station in response to said notification message, and starting transfer of the packet destined for the mobile station to the base station to which the mobile station is handed over when a control message for designating a packet transfer rate is received from the base station.

4. A packet transfer apparatus connected between a communication network and a plurality of base stations each of each conducts communication with a plurality of mobile stations via radio channels, for transferring packets destined for specific mobile stations received from said communication network to a base station accommodating said specific mobile stations, comprising:

means for grouping a plurality of mobile stations under control of said base stations into a plurality of rate classes fro each base station in accordance with transmission rates of the radio channels of said mobile stations;

storing means for storing packets received from said communication network into buffer areas correlated to said rate classes, in accordance with the rate class of the destination mobile station of each of the received packets;

receiving means for receiving, from each of said base stations, control messages each generated periodically according to the rate of packet transfer between the base station and mobile stations belonging to one of said rate classes under control of the base station, each of said control message indicating a window size in association with each of rate classes; and control means for reading out packets of a specific rate class from said buffer areas in accordance with the window size indicated in the control message received by said receiving means and transmitting the packets to the base station accommodating the destination mobile station of the packets.

5. A wireless communication system comprising a plurality of base stations for performing communication with a plurality of mobile stations via radio channels, and a packet transfer apparatus connected between said plurality of base stations and a communication network, wherein each of said base stations comprises:

a buffer memory divided in a plurality of rate class areas according to data transmission rates in a forward link radio channels between mobile stations under control and the base station;

means for generating a control message for instructing a transfer amount of packets from said packet transfer apparatus to the base station at each rate class in accordance with a free space in each of the rate class areas in said buffer memory and transmitting the control message to said packet transfer apparatus;

means for storing a packet received from said packet transfer apparatus into a rate class area corresponding to the destination mobile station of said received packet in said buffer memory; and means for reading out packets at a rate corresponding to a rate class from each of the rate class areas in said buffer memory and transmitting the packet to the destination mobile station, and said packet transfer apparatus comprises:

means for grouping packets received from said communication network into rate classes according to data transmission rates of destination mobile stations and buffering the packets; and means for reading out said buffered packets in accordance with a transfer amount of each rate class indicated by the control message received from each of said base stations and transmitting the packet to the base station corresponding to the destination mobile station of the packet.

* * * * *